United States Patent [19]

Schurig

[11] Patent Number: 5,818,821
[45] Date of Patent: Oct. 6, 1998

[54] UNIVERSAL LAN POWER LINE CARRIER REPEATER SYSTEM AND METHOD

[75] Inventor: Alma Karl Schurig, Orem, Utah

[73] Assignee: Intelogis, Inc., American Fork, Utah

[21] Appl. No.: 710,841

[22] Filed: Sep. 23, 1996

Related U.S. Application Data

[63] Continuation of Ser. No. 366,897, Dec. 30, 1994, abandoned.

[51] Int. Cl.$^6$ ...................................................... H04N 7/10
[52] U.S. Cl. .................... 370/293; 370/463; 340/310.06; 455/3.3
[58] Field of Search ........................ 340/310.01, 310.06, 340/310.02; 375/211, 214, 257, 258; 455/3.3, 7, 14, 15, 16, 17, 3.1; 380/9; 370/276, 294, 295, 293, 492, 489, 445, 463

[56] References Cited

U.S. PATENT DOCUMENTS

| | | | |
|---|---|---|---|
| 3,440,576 | 4/1969 | Hafner | 333/95 |
| 3,458,657 | 7/1969 | Lester et al. | 179/2.5 |
| 3,467,835 | 9/1969 | De Cola | 307/15 |
| 3,483,546 | 12/1969 | Ausfeld | 340/310 |
| 3,531,272 | 9/1970 | Menear | 65/33 |
| 3,846,638 | 11/1974 | Wetherell | 307/2 |
| 3,876,984 | 4/1975 | Chertok | 340/152 R |
| 3,911,415 | 10/1975 | Whyte | 340/310 A |
| 3,924,223 | 12/1975 | Whyte et al. | 340/310 R |
| 3,938,129 | 2/1976 | Smither | 340/310 R |
| 3,942,163 | 3/1976 | Whyte | 340/310 R |
| 3,944,723 | 3/1976 | Fong | 178/3 |
| 3,962,547 | 6/1976 | Pattantyus-Abraham | 179/2.5 R |
| 3,967,264 | 6/1976 | Whyte et al. | 340/310 A |
| 3,973,187 | 8/1976 | Fong | 179/170 R |
| 4,004,110 | 1/1977 | Whyte | 179/170 J |
| 4,008,467 | 2/1977 | Pattantyus-Abraham et al. | 340/310 A |
| 4,012,733 | 3/1977 | Whyte | 340/310 A |
| 4,016,429 | 4/1977 | Vercellotti et al. | 307/149 |
| 4,058,678 | 11/1977 | Dunn et al. | 179/2.5 R |
| 4,065,763 | 12/1977 | Whyte et al. | 340/310 R |
| 4,066,912 | 1/1978 | Wetherell | 307/3 |
| 4,090,184 | 5/1978 | Hamilton, II | 340/310 A |
| 4,130,861 | 12/1978 | LaForest | 363/39 |
| 4,142,178 | 2/1979 | Whyte et al. | 340/310 R |
| 4,173,754 | 11/1979 | Feiker | 340/310 R |
| 4,188,619 | 2/1980 | Perkins | 340/310 R |
| 4,199,761 | 4/1980 | Whyte et al. | 340/695 |
| 4,205,360 | 5/1980 | Drucker | 361/68 |
| 4,210,901 | 7/1980 | Whyte et al. | 340/310 R |
| 4,222,035 | 9/1980 | Lohoff | 340/167 R |
| 4,245,215 | 1/1981 | O'Connor et al. | 340/310 A |
| 4,254,402 | 3/1981 | Perkins | 340/310 R |
| 4,270,206 | 5/1981 | Hughes | 375/9 |
| 4,300,126 | 11/1981 | Gajjar | 340/310 A |
| 4,302,844 | 11/1981 | Bruene | 375/58 |
| 4,307,380 | 12/1981 | Gander | 340/310 R |
| 4,311,964 | 1/1982 | Boykin | 329/104 |
| 4,323,882 | 4/1982 | Gajjar | 340/310 R |
| 4,344,066 | 8/1982 | Beggs | 340/310 A |
| 4,355,303 | 10/1982 | Phillips et al. | 340/310 A |
| 4,357,598 | 11/1982 | Melvin, Jr. | 340/310 A |
| 4,371,867 | 2/1983 | Gander | 340/310 R |
| 4,377,804 | 3/1983 | Suzuki | 340/310 A |
| 4,379,284 | 4/1983 | Boykin | 340/310 R |
| 4,380,009 | 4/1983 | Long et al. | 340/825.55 |
| 4,386,436 | 5/1983 | Kocher et al. | 455/151 |

(List continued on next page.)

*Primary Examiner*—Chi H. Pham
*Assistant Examiner*—R. Ngo
*Attorney, Agent, or Firm*—Knobbe, Martens, Olson & Bear, LLP

[57] ABSTRACT

A universal local area network power line carrier repeater system and method provides: 1) LAN interfaces for converting high speed LAN data to high speed PLC data and high speed PLC data to high speed LAN data, 2) a high speed PLC data transceiver for exchanging PLC data with other repeaters, and 3) a repeater control system and method for arbitrating data communications on the power line medium among the plurality of repeaters seeking access to said medium.

15 Claims, 27 Drawing Sheets

U.S. PATENT DOCUMENTS

| | | | |
|---|---|---|---|
| 4,400,688 | 8/1983 | Johnston et al. | 340/310 R |
| 4,408,185 | 10/1983 | Rasmussen | 340/310 A |
| 4,408,186 | 10/1983 | Howell | 340/310 A |
| 4,427,968 | 1/1984 | York | 340/310 R |
| 4,429,299 | 1/1984 | Kabat et al. | 340/310 R |
| 4,433,284 | 2/1984 | Perkins | 323/361 |
| 4,433,326 | 2/1984 | Howell | 340/310 A |
| 4,438,519 | 3/1984 | Bose | 375/1 |
| 4,468,792 | 8/1984 | Baker et al. | 375/45 |
| 4,471,399 | 9/1984 | Udren | 361/64 |
| 4,473,816 | 9/1984 | Perkins | 340/310 R |
| 4,473,817 | 9/1984 | Perkins | 340/310 R |
| 4,475,193 | 10/1984 | Brown | 370/124 |
| 4,475,209 | 10/1984 | Udren | 375/4 |
| 4,479,033 | 10/1984 | Brown et al. | 179/2.51 |
| 4,479,215 | 10/1984 | Baker | 371/33 |
| 4,481,501 | 11/1984 | Perkins | 340/310 R |
| 4,495,386 | 1/1985 | Brown et al. | 179/2.51 |
| 4,510,611 | 4/1985 | Dougherty | 375/8 |
| 4,514,594 | 4/1985 | Brown et al. | 179/2.51 |
| 4,514,719 | 4/1985 | Suzuki et al. | 340/310 R |
| 4,516,079 | 5/1985 | York | 329/104 |
| 4,523,307 | 6/1985 | Brown et al. | 370/30 |
| 4,535,447 | 8/1985 | Rosanes et al. | 370/77 |
| 4,538,136 | 8/1985 | Drabing | 340/310 R |
| 4,556,864 | 12/1985 | Roy | 375/257 X |
| 4,556,865 | 12/1985 | Fukagawa et al. | 455/7 X |
| 4,563,650 | 1/1986 | York et al. | 329/50 |
| 4,566,866 | 1/1986 | Gorecki | 340/310 A |
| 4,567,557 | 1/1986 | Burns | 364/145 |
| 4,569,045 | 2/1986 | Schieble et al. | 370/85 |
| 4,580,276 | 4/1986 | Andruzzi, Jr. et al. | 375/42 |
| 4,583,231 | 4/1986 | Puckette | 375/1 |
| 4,599,598 | 7/1986 | Komoda et al. | 340/310 A |
| 4,602,240 | 7/1986 | Perkins et al. | 340/310 R |
| 4,609,839 | 9/1986 | Howell | 307/542 |
| 4,611,274 | 9/1986 | Machino et al. | 364/200 |
| 4,622,526 | 11/1986 | Scheider et al. | 333/181 |
| 4,630,284 | 12/1986 | Cooperman | 375/36 |
| 4,633,218 | 12/1986 | Palsgrove et al. | 340/310 A |
| 4,636,771 | 1/1987 | Ochs | 340/310 CP |
| 4,638,299 | 1/1987 | Cambell | 340/310 A |
| 4,641,322 | 2/1987 | Hasegawa | 375/1 |
| 4,642,607 | 2/1987 | Strom et al. | 340/310 A |
| 4,644,321 | 2/1987 | Kennon | 340/310 A |
| 4,645,956 | 2/1987 | Shuey | 307/562 |
| 4,656,593 | 4/1987 | Gleba et al. | 364/492 |
| 4,658,241 | 4/1987 | Torre | 340/551 |
| 4,668,934 | 5/1987 | Shuey | 340/310 A |
| 4,675,579 | 6/1987 | Hardy et al. | 315/318 |
| 4,675,648 | 6/1987 | Roth et al. | 340/310 A |
| 4,686,382 | 8/1987 | Shuey | 370/149 |
| 4,697,166 | 9/1987 | Warnagiris et al. | 340/310 R |
| 4,700,343 | 10/1987 | Champarnaud et al. | 370/85 |
| 4,701,945 | 10/1987 | Pedigo | 379/66 |
| 4,706,801 | 11/1987 | Smith, Jr. et al. | 250/270 |
| 4,714,912 | 12/1987 | Roberts et al. | 340/310 R |
| 4,724,435 | 2/1988 | Moses et al. | 340/870.13 |
| 4,745,391 | 5/1988 | Gajjar | 340/310 A |
| 4,745,392 | 5/1988 | Ise et al. | 340/310 R |
| 4,746,809 | 5/1988 | Coleman et al. | 307/1 |
| 4,746,897 | 5/1988 | Shuey | 340/310 R |
| 4,749,992 | 6/1988 | Fitzmeyer et al. | 340/310.01 X |
| 4,761,623 | 8/1988 | Schneiber | 333/167 |
| 4,763,103 | 8/1988 | Galula et al. | 340/310 R |
| 4,766,414 | 8/1988 | Shuey | 340/310 A |
| 4,772,870 | 9/1988 | Reyes | 340/310 R |
| 4,774,493 | 9/1988 | Rabinowitz | 340/310 A |
| 4,782,482 | 11/1988 | Kiatipov et al. | 370/86 |
| 4,785,195 | 11/1988 | Rochelle et al. | 307/8 |
| 4,788,527 | 11/1988 | Johansson | 340/310 A |
| 4,804,938 | 2/1989 | Rouse et al. | 340/310 A |
| 4,805,196 | 2/1989 | Cooperman et al. | 375/107 |
| 4,809,296 | 2/1989 | Braun et al. | 375/1 |
| 4,815,106 | 3/1989 | Propp et al. | 375/36 |
| 4,829,298 | 5/1989 | Fernandes | 340/870.27 |
| 4,835,517 | 5/1989 | van der Gracht et al. | 340/310 A |
| 4,845,466 | 7/1989 | Hariton et al. | 340/310 R |
| 4,864,588 | 9/1989 | Simpson et al. | 375/1 |
| 4,864,589 | 9/1989 | Endo | 375/1 |
| 4,866,733 | 9/1989 | Morishita | 375/1 |
| 4,885,563 | 12/1989 | Johnson et al. | 340/310 A |
| 4,885,564 | 12/1989 | Vercellotti et al. | 340/310 A |
| 4,890,089 | 12/1989 | Shuey | 340/310 A |
| 4,896,277 | 1/1990 | Vercellotti et al. | 364/551.01 |
| 4,903,006 | 2/1990 | Boomgaard | 340/310 A |
| 4,912,553 | 3/1990 | Pal et al. | 358/86 |
| 4,912,723 | 3/1990 | Verbanets, Jr. | 375/7 |
| 4,914,418 | 4/1990 | Mak et al. | 340/310 A |
| 4,918,422 | 4/1990 | Mak | 340/310 R |
| 4,918,690 | 4/1990 | Markkula, Jr. et al. | 370/94 |
| 4,924,150 | 5/1990 | Nilssen | 315/244 |
| 4,937,569 | 6/1990 | Trask et al. | 340/310 R |
| 4,939,728 | 7/1990 | Markkula, Jr. et al. | 370/94.3 |
| 4,941,143 | 7/1990 | Twitty et al. | 370/85.2 |
| 4,947,484 | 8/1990 | Twitty et al. | 371/37.1 |
| 4,952,905 | 8/1990 | Oliver | 340/310 R |
| 4,955,018 | 9/1990 | Twitty et al. | 370/85.1 |
| 4,962,496 | 10/1990 | Vercellotti et al. | 370/11 |
| 4,963,853 | 10/1990 | Mak | 340/310 A |
| 4,964,138 | 10/1990 | Nease et al. | 375/1 |
| 4,968,970 | 11/1990 | LaPorte | 375/258 X |
| 4,969,146 | 11/1990 | Twitty et al. | 370/85.1 |
| 4,969,147 | 11/1990 | Markkula, Jr. et al. | 370/94.1 |
| 4,973,940 | 11/1990 | Sakai et al. | 340/310 R |
| 4,973,954 | 11/1990 | Schwarz | 340/825.05 |
| 4,979,183 | 12/1990 | Cowart | 375/1 |
| 4,980,665 | 12/1990 | Schotz | 340/310 R |
| 4,988,972 | 1/1991 | Takagi | 340/310 A |
| 4,995,053 | 2/1991 | Simpson et al. | 375/1 |
| 4,996,513 | 2/1991 | Mak et al. | 340/310 R |
| 5,003,457 | 3/1991 | Ikei et al. | 364/133 |
| 5,018,138 | 5/1991 | Twitty et al. | 370/94.1 |
| 5,029,180 | 7/1991 | Cowart | 375/1 |
| 5,032,082 | 7/1991 | Herrera | 433/141 |
| 5,032,833 | 7/1991 | Laporte | 340/825.02 |
| 5,034,882 | 7/1991 | Eisenhard et al. | 364/200 |
| 5,045,816 | 9/1991 | Bramhall et al. | 332/105 |
| 5,049,876 | 9/1991 | Kahle et al. | 340/825.57 |
| 5,051,720 | 9/1991 | Kittirutsunetorn | 340/310 R |
| 5,057,829 | 10/1991 | Velazquez | 340/310.01 X |
| 5,066,939 | 11/1991 | Mansfield, Jr. | 340/310 R |
| 5,081,440 | 1/1992 | Ott et al. | 340/310 A |
| 5,084,868 | 1/1992 | Kelly et al. | 370/69.1 |
| 5,090,024 | 2/1992 | Vander Mey et al. | 375/1 |
| 5,103,463 | 4/1992 | Schoeneberg | 375/51 |
| 5,109,527 | 4/1992 | Akerberg | 455/33.2 |
| 5,113,498 | 5/1992 | Evan et al. | 395/275 |
| 5,132,986 | 7/1992 | Endo et al. | 375/1 |
| 5,146,471 | 9/1992 | Cowart | 375/1 |
| 5,148,144 | 9/1992 | Sutterlin et al. | 340/310 A |
| 5,151,838 | 9/1992 | Dockery | 340/310 R |
| 5,155,431 | 10/1992 | Holcomb | 324/121 R |
| 5,155,466 | 10/1992 | Go | 340/310 R |
| 5,161,021 | 11/1992 | Tsai | 358/188 |
| 5,166,953 | 11/1992 | Hershey et al. | 375/202 |
| 5,168,170 | 12/1992 | Hartig | 307/35 |
| 5,168,510 | 12/1992 | Hill | 375/40 |
| 5,185,951 | 2/1993 | Shuey | 340/310 A |
| 5,187,865 | 2/1993 | Dolin, Jr. | 29/868 |
| 5,189,412 | 2/1993 | Mehta et al. | 340/825.22 |
| 5,189,683 | 2/1993 | Cowart | 375/1 |

| | | | |
|---|---|---|---|
| 5,192,231 | 3/1993 | Dolin, Jr. ................................. | 439/620 |
| 5,195,098 | 3/1993 | Johnson et al. ......................... | 371/37.2 |
| 5,203,003 | 4/1993 | Donner .................................... | 395/800 |
| 5,206,657 | 4/1993 | Downey ................................... | 343/742 |
| 5,210,518 | 5/1993 | Graham et al. ...................... | 340/310 R |
| 5,210,519 | 5/1993 | Moore ................................ | 340/310 R |
| 5,218,552 | 6/1993 | Stirk et al. ............................. | 364/492 |
| 5,239,686 | 8/1993 | Downey ..................................... | 455/78 |
| 5,241,283 | 8/1993 | Sutterlin ................................... | 330/51 |
| 5,243,338 | 9/1993 | Brennan, Jr. et al. ............. | 340/870.02 |
| 5,245,633 | 9/1993 | Schwartz et al. ....................... | 375/100 |
| 5,249,270 | 9/1993 | Stewart et al. .......................... | 395/200 |
| 5,257,006 | 10/1993 | Graham et al. .................... | 340/310 A |
| 5,260,974 | 11/1993 | Johnson et al. ........................... | 375/76 |
| 5,262,755 | 11/1993 | Mak et al. ........................ | 340/310 R |
| 5,262,823 | 11/1993 | Nakajima et al. ...................... | 355/205 |
| 5,263,046 | 11/1993 | Vander May ............................... | 375/1 |
| 5,263,050 | 11/1993 | Sutterlin et al. ........................... | 375/1 |
| 5,264,823 | 11/1993 | Stevens .............................. | 340/310 A |
| 5,268,666 | 12/1993 | Michel et al. ...................... | 340/310 R |
| 5,278,862 | 1/1994 | Vander Mey ............................... | 375/1 |
| 5,289,476 | 2/1994 | Johnson et al. ..................... | 375/308 X |
| 5,289,498 | 2/1994 | Hurlbut et al. ............................ | 375/1 |
| 5,297,143 | 3/1994 | Fridrich et al. ........................ | 370/85.3 |
| 5,319,634 | 6/1994 | Bartholomew et al. .................. | 370/18 |
| 5,319,641 | 6/1994 | Fridrich et al. ........................ | 370/85.3 |
| 5,327,230 | 7/1994 | Dockery ..................................... | 348/8 |
| 5,327,426 | 7/1994 | Dolin, Jr. et al. ................. | 370/85.13 |
| 5,343,338 | 8/1994 | Murata et al. ............................ | 360/69 |
| 5,345,592 | 9/1994 | Woodmas .................................. | 455/3.3 |
| 5,347,549 | 9/1994 | Baumann et al. ....................... | 375/117 |
| 5,349,644 | 9/1994 | Massey et al. .......................... | 395/200 |
| 5,351,272 | 9/1994 | Abraham .................................. | 375/38 |
| 5,355,114 | 10/1994 | Sutterlin et al. ....................... | 340/310 |
| 5,357,541 | 10/1994 | Cowart ...................................... | 375/1 |
| 5,359,625 | 10/1994 | Vander Mey et al. ...................... | 375/1 |
| 5,377,227 | 12/1994 | Hurlbut et al. ............................ | 375/1 |
| 5,391,932 | 2/1995 | Small et al. ............................ | 307/125 |
| 5,400,246 | 3/1995 | Wilson et al. .......................... | 364/146 |
| 5,404,127 | 4/1995 | Lee et al. ........................... | 340/310.02 |
| 5,406,248 | 4/1995 | Le Van Suu ...................... | 340/310.01 |
| 5,406,249 | 4/1995 | Pettus ............................... | 340/310.06 |
| 5,408,497 | 4/1995 | Baumann et al. .......................... | 375/7 |
| 5,410,292 | 4/1995 | Le Van Suu ...................... | 340/310.06 |
| 5,412,369 | 5/1995 | Kirchner ........................... | 340/310.03 |
| 5,420,572 | 5/1995 | Dolin, Jr. et al. ................ | 340/825.22 |
| 5,424,709 | 6/1995 | Tal ................................... | 340/310.01 |
| 5,424,710 | 6/1995 | Bauman ............................. | 340/310.01 |
| 5,448,593 | 9/1995 | Hill ......................................... | 375/267 |
| 5,452,291 | 9/1995 | Eisenhandler et al. ................... | 370/54 |
| 5,452,344 | 9/1995 | Larson .................................... | 379/107 |
| 5,454,008 | 9/1995 | Baumann et al. ...................... | 375/369 |
| 5,457,689 | 10/1995 | Marvit et al. .......................... | 370/85.8 |
| 5,461,629 | 10/1995 | Sutterlin et al. .......................... | 371/30 |
| 5,463,662 | 10/1995 | Sutterlin et al. ........................ | 375/351 |
| 5,467,011 | 11/1995 | Hunt .......................................... | 324/67 |
| 5,471,190 | 11/1995 | Zimmerman ...................... | 340/310.01 |
| 5,471,209 | 11/1995 | Sutterlin et al. ........................ | 341/143 |
| 5,475,363 | 12/1995 | Suzuki et al. ........................... | 340/506 |
| 5,475,687 | 12/1995 | Markkula, Jr. et al. ............... | 370/85.1 |

| FIG. 3A | FIG. 3B | FIG. 3C | FIG. 3D |
|---------|---------|---------|---------|
| FIG. 3E | FIG. 3F | FIG. 3G | FIG. 3H |
| FIG. 3I | FIG. 3J | FIG. 3K | FIG. 3L |
| FIG. 3M | FIG. 3N | FIG. 3O | FIG. 3P |
| FIG. 3Q | FIG. 3R | | |

FIG. 3

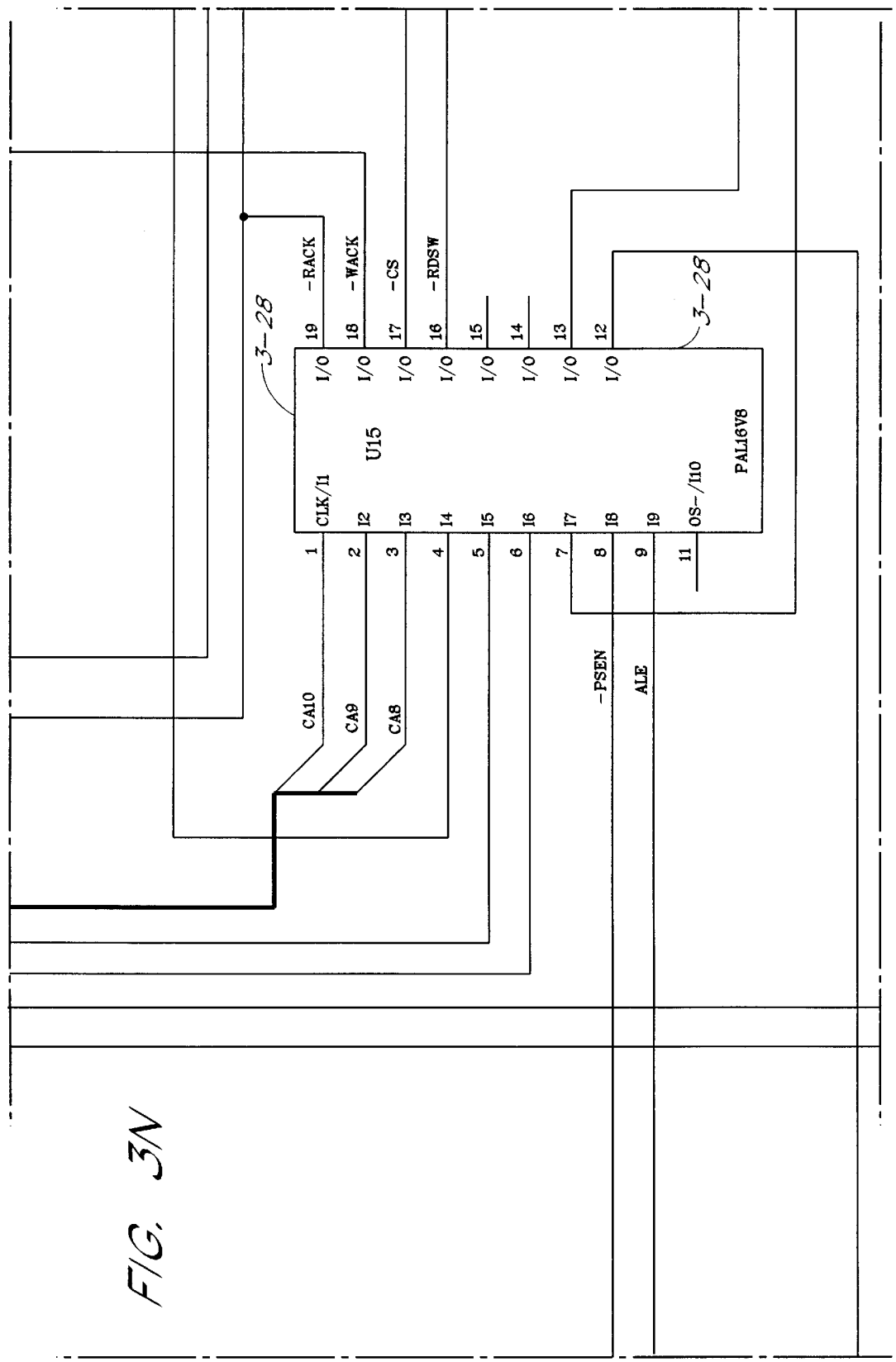

UNIVERSAL LAN POWER LINE CARRIER REPEATER SYSTEM AND METHOD

This application is a continuation of U.S. application Ser. No. 08/366,897, filed on Dec. 30, 1994 for UNIVERSAL LAN POWER LINE CARRIER REPEATER SYSTEM AND METHOD, now abandoned.

BACKGROUND OF THE INVENTION

A. Field of the Invention

This invention relates to Power Line Carrier (PLC) Local Area Network (LAN) repeaters in which LAN signal/data are transferred over the existing power lines of a building via power line carrier rather than through special cables which must be installed professionally. A PLC LAN repeater must A) interface effectively with the LAN and its protocols, B) achieve data rates over the power lines which are at least an order of magnitude faster than those of prior art PLC systems and C) provide acceptable operation to a plurality of users. While many LAN (including Arcnet, Token Ring and RS-485) are in use and may be serviced by the instant invention, the Ethernet LAN will be examined to illustrate the interface and data rate requirements for this invention.

B. Background Art

The Ethernet IEEE 802.3 standard provides for mechanical and electrical standards and protocols for multiple users to share ("network") data transfer access to a common transmission medium or bus (the "ether" of a cable) but still maintain acceptable data access times and transmission rates. A user accesses the network through his node on the network, which is usually his computer\workstation with a hardware LAN interface physically connected to the network cable as the node. Proprietary network software (such as NetWare and Windows for Workgroups) runs with the workstation's operating system to manage the interface between the user's applications and the network. Individual users are provided unique ID/address codes so that only messages with the correct address preamble may be accepted and routed into their node/workstation while ignoring all others. The protocols also provide for detecting and managing collisions between the plurality of network users seeking simultaneous access to the network so that only one user may safely transmit data at a time. The software for implementing this carrier sense multiple access with collision detection protocol (CSMA/CD) is usually divided between firmware embedded in the Ethernet interface cards and the proprietary workstation software.

In a peer to peer network configuration, a two or more workstations may be networked together. Each user may communicate with any other user with network protocols arbitrating data collisions when more than one user seeks to initiate communication at a time. In the Ethernet specification, when a collision is detected, each user interface backs off for a "random" time before reattempting access (CSMA/CD). In a client-file server configuration, each user communicates with the server as well as directly with other users. Arbitration takes place between the users and the server.

Since a large number of users results in a frequent data transfers as well as collision arbitration, the data rate of Ethernet must be very high to accommodate acceptable transmission time delays. Consequently, the IEEE 802.3 standard provides for data transmission at the rate of 10 Mbps in packets of no more than 1,500 bytes. Such speeds are three orders of magnitude beyond prior art PLC transceivers (and 20 Kbps RS-232 standards). See U.S. Pat. Nos. 4,556,864 and 5,289,476 for examples of prior art PLC data communication/LAN technology.

In addition, Ethernet mechanical standards provide for bidirectional communications either by coaxial cable ("thin/thick net") or by dual sets of unshielded twisted pairs (one for each direction of data flow) called UTP or "10BaseT" cable. Coaxial interfaces utilize a transceiver to interface between the bidirectional digital data of one computer and the RF data modulated signals of the coax/thin net. The 10BaseT medium accommodates the bidirectional data more directly by using 2 sets of twisted pairs (one for transmit and one for receive data). To achieve 10 Mbps data throughput an interface standard similar to RS-485 (CCITT V.11) is employed, which provides for balanced, isolated and low impedance transmitters and differential receivers. (See Appendix A). The RS-485 standard provides for up to 32 transmitters and receivers networked on the same data line. Both coaxial and UTP communications interfaces/LAN cards have been reduced to low cost, high performance commercial products sourced by many companies.

The problem with LAN systems such as Ethernet is the installation expense for the cables which can exceed $100 per "node" or user. Often the old commercial structures are prohibitively difficult to retrofit. Other companies are periodically requiring reconfiguration of office space to accommodate changing commercial needs and require a less expensive and more friendly method for connecting and reconfiguring workstations to their LAN. And there are limitations as to the length of cable one can use. The instant invention provides a cost effective alternative to special cable installation by "repeating" the network via power line carrier data transmission over the AC power lines of a premises.

RF LAN repeaters have been offered in the 900 MHz range where sufficient bandwidth is available to transmit the 10 Mbps signals. However, the 900 MHz systems are not only prohibitively expensive (at $600–800 per node) but also exhibit propagation problems and interference in commercial buildings where LAN systems are most commonly used and the software for managing a large number of users has been unacceptable, which (in addition to high cost) has detracted seriously from their widespread proliferation.

SUMMARY OF THE INVENTION

The instant invention, however, provides both the interface for the commercial LAN card/port as well as the PLC repeater system capable of transferring data packets at sufficiently high rates and with collision detection/prevention firmware for transparency with respect to small and medium sized LAN systems at a competitive cost.

The PLC repeater/transceiver comprises both a novel data transmitter and advanced data receiver with over 90 dB of gain, which together are capable of high bandwidth/data rate FSK transmission at data rates of DC to over 2 Mbps (million bits per second). RF PLC frequencies of 2–20 MHz combined with sufficient transmitter power and receiver sensitivity achieve adequate signal to noise ratios in AC power systems with high attenuation and noise. The over 90 dB sensitivity/RF range permits proper data transmission over the 3 phase power distribution system in industrial installations with capacitive loads and electrical equipment induced noise. The RF carrier frequencies in combination with the receiver sensitivity permit the signals to jump phases in residential 2 phase and industrial 3 phase distribution systems by means of the capacitance between phases in the wiring. The highly deviated (greater than 100 KHz)

FSK signal in combination with the high RF carrier frequency and 3 stages of RF and IF filtering in the receiver makes the data transmission very robust in the presence of electrical interference.

Multiple transceivers are capable of simultaneous operation at different RF carrier frequencies, permitting full duplex serial communication as well as multiple networks operating without interference on the same power line bus.

The LAN interface comprises 2 subsystems: 1) a bidirectional LAN card or port interface a) for receiving (and storing in buffers) outgoing data packets in the LAN system format from a user's workstation for transmission to other LAN users and b) for returning data packets in the LAN format to the same workstation card/port from other users, and 2) an asynchronous serial data transceiver (with data buffering) which a) drives the PLC data transmitter with the outgoing data packets stored in the buffer by the port interface and b) receives incoming data from the PLC data receiver originating from other users. The serial data transceiver is controlled by a system controller with firmware i) to arbitrate data collisions on the power line data bus with other users and ii) to manage the bidirectional transfer of data packets, OUTGOING from LAN interface to serial data transceiver and INCOMING from serial data transceiver back to LAN interface. Commercial controllers are available for managing the entire repeater which contain both the asynchronous PLC serial port and some LAN interface ports such as RS-232 and RS-485, as well as parallel ports.

A relatively simple and low cost PLC LAN repeater networks workstations through their standard serial ports using software such as NetWare Lite. The PLC LAN repeater consists of a low cost but competent microcontroller with 1) an RS-232D port (115.2 Kbaud) for connecting a built in serial port to the users and 2) an asynchronous serial communications port which connects to the PLC transceiver. The onboard controller firmware manages the storage and retransmission of data packets in addition to collision arbitration and detection on the PLC bus. The PLC LAN repeater thus converts a 2 user RS-232 peer to peer network into a more than 2 user network (like RS-485) without the user having to buy a (more expensive and less common) RS-485 type of interface. The data rate for the PLC bus could be 10 times higher than the limited 115.2 Kbaud of the conventional serial port, making this kind of PLC bus network capable of handling much larger data traffic than is possible with an ordinary RS-232 serial port network.

The proliferation of embedded controllers in a plethora of electrical/electronic equipment can be effectively networked with control/maintenance/security systems via PLC LAN repeater subsystems also embedded in the equipment, which repeaters network the serial port of the embedded controllers to a PLC LAN bus via the existing power cord of the equipment and the power distribution system of a premises. For many years the inventor has applied this same concept of embedded PLC LAN repeater to many types of computers and related products, modems, industrial control systems and utility metering equipment. The instant invention facilitates the higher data rates and transmission integrity required by these systems.

For LANs using the RS-485 ports, a high speed 485 interface is provided together with a controller for converting the data to PLC transceiver compatible rates and format.

A more complex configuration for Ethernet illustrates the scope of application of the universal repeater and utilizes a commercial Ethernet interface chip in combination with a microcontroller with global high speed communication port for servicing the PLC transceiver. This provides a transparent PLC repeater which connects to the standard Ethernet ports of a workstation and, with NO additional software or hardware, permits multiple users to network over the existing power lines of a premises.

The versatility of configurations also supports Token Ring and Arcnet protocols, chiefly because the PLC transceiver is competent enough to handle sufficiently high data rates to permit transparent operation for smaller segments of the network.

OBJECTS

Accordingly, it is an object of the invention to provide an advanced method and system of high data rate power line carrier transmission which supports the data rates required by local area networks.

It is an object to provide a method and system of interfacing power line carrier repeaters with conventional network cables or cards to convert LAN data to PLC repeater acceptable data and to convert PLC repeater data to LAN data.

It is a further object to provide a method and system of arbitrating multiple PLC LAN repeaters to permit efficient and exclusive access to a particular frequency/channel of the power line medium.

It is an object to provide a PLC transceiver which sends data with a bandwidth of DC to over 2 Mbps and which is therefore able to transfer wideband analog signals/data of DC to over 1 MHz bandwidth.

It is an object to provide an embedded PLC network repeater system capable of being interfaced with embedded controllers in equipment for networking said equipment with automation, control and diagnostics systems and general network services.

DETAILED DESCRIPTION OF THE PREFERRED EMBODIMENTS

A universal local area network (LAN) power line carrier (PLC) repeater system and method is described which provides: 1) a competent LAN repeater interface for converting high speed LAN data to PLC serial data and high speed PLC serial data to LAN data, 2) a high speed PLC data transceiver for exchanging PLC data with other repeaters, and 3) a control system and method for controlling the interface and transceiver to arbitrate data communications on the PLC bus among the plurality of PLC repeaters. In the following description, the Ethernet LAN PLC repeater is set forth in specific detail in order to provide a thorough understanding of the invention in a non-trivial application. It will be apparent to one of ordinary skill in the art that these specific details are beyond what is necessary to practice the present invention. In other instances, well-known circuits, interfaces and software structures have not been shown in detail in order not to unnecessarily obscure the present invention.

Figure 1:
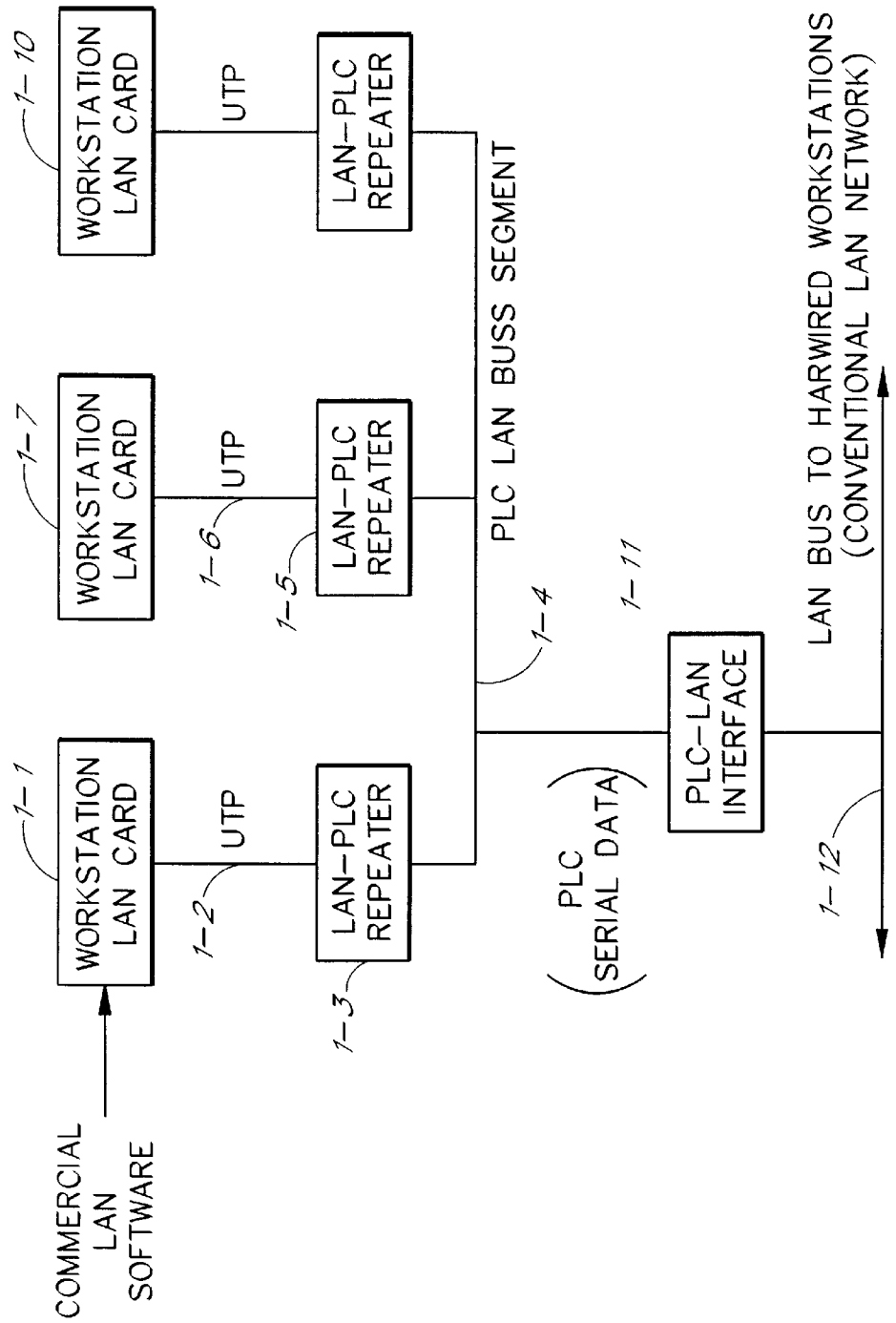
FIG. 1 is a diagram of a PLC LAN repeater network.

Reference is first made to FIG. 1 in which a plurality of workstations are networked together by means of PLC repeaters and the AC power system of a premises. Workstation 1-1 with its corresponding LAN card is connected via UTP 1-2 to LAN-PLC repeater 1-3 to the AC power line 1-4 of a premises which constitutes a PLC LAN bus in addition to distributing AC power to the various appliances, equipment and workstations (1-1, 1-7, 1-10) of the premises. Data from workstation 1-1 is repeated onto the PLC LAN bus 1-4 in proper format for LAN-PLC repeater 1-5 to receive said data and repeat it in LAN format via UTP 1-6 to workstation 1-7 and its corresponding LAN card. Workstations 1-1, 1-7 and 1-10 are operated by commercial LAN software which, at a minimum, supports a peer to peer configuration of users, thus permitting messages and files to be transferred between any two peers of the network. The LAN PLC repeater permits said data to be transferred between workstations "transparently", that is, without any additional effort or special instructions/software on the part of the workstation and its operating system. Therefore, workstation 1-7 receives the data originating from workstation 1-1 and confirms receipt thereof back to 1-1 via UTP 1-6, repeaters 1-5, AC power bus 1-4, repeater 1-3 and UTP 1-2.

While two workstations networked together peer to peer constitute the minimum configuration of a network and do not require sophisticated network arbitration, many commercial network products assume that additional workstations, represented by 1-10, may be connected to the network, seeking network access simultaneous with other workstations and requiring CSMA/CD. In a PLC LAN repeater, arbitration protocols peculiar to the PLC environment need to be serviced transparently to the workstations/users.

FIG. 1 also illustrates a segmented bus configuration comprising both a conventional hardwired LAN bus segment 1-12 and a PLC LAN segment 1-4 operably networked together by means of PLC-LAN interface 1-11. In this example, the LAN bus 1-12 networks physically proximate workstations together (not illustrated), while the PLC bus segment 1-4 could network physically less proximate or more mobile workstations 1-1, 1-7 and 1-10 to the network via PLC-LAN interface 1-11. Interface 1-11 is also a "repeater" similar in hardware to repeater 1-3, but may include software/firmware which identifies and repeats only those LAN packets/data addressed to workstations 1-1, 1-7 and 1-10 on the PLC LAN segment 1-4, thereby reducing the data traffic load on said PLC segment 1-4. In large networks involving many workstations, a plurality of PLC LAN segments 1-4, each operating on its exclusive PLC frequency and serviced by its respective PLC-LAN interface 1-11, may be networked together by means of the instant invention, while sharing the AC power distribution bus through frequency domain multiple access or other multiple access techniques such as code division multiple access or time domain multiply access.

Referring still to FIG. 1, other communication devices besides workstations may be represented by workstations 1-1, 1-7 and 1-10. For example, embedded microcontrollers 1-1 and 1-7 with communication ports could be networked through embedded repeaters 1-3 and 1-5 with a host controller 1-10 which monitors/controls the operation of the equipment hosting said microcontrollers. A relatively simple network communication and arbitration protocol could be administered by said host repeater 1-8. Such protocols have been developed for applications such as utility meter reading and industrial control systems.

Figure 2:
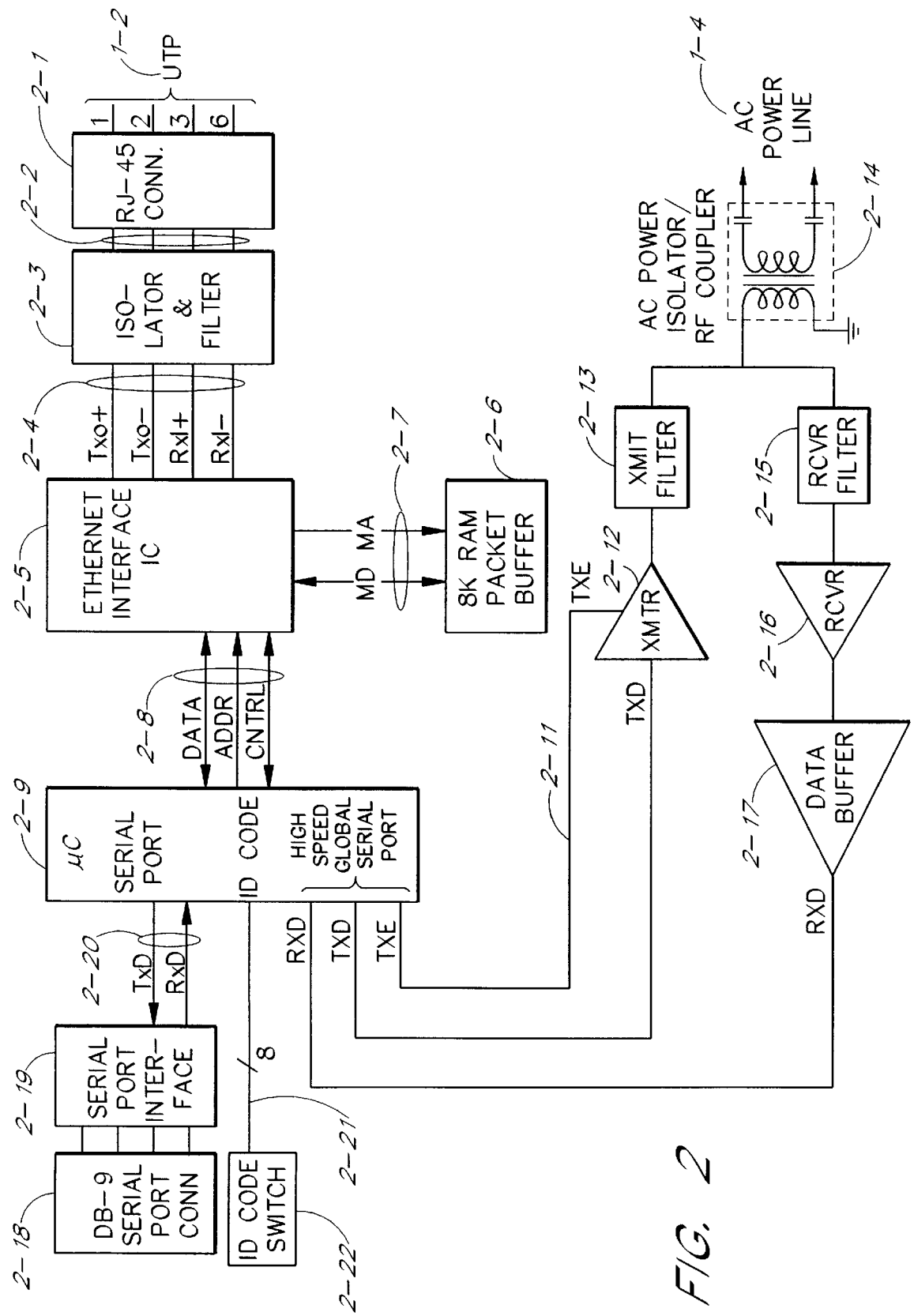
FIG. 2 is a block diagram of a PLC LAN repeater.
Figure 3A:
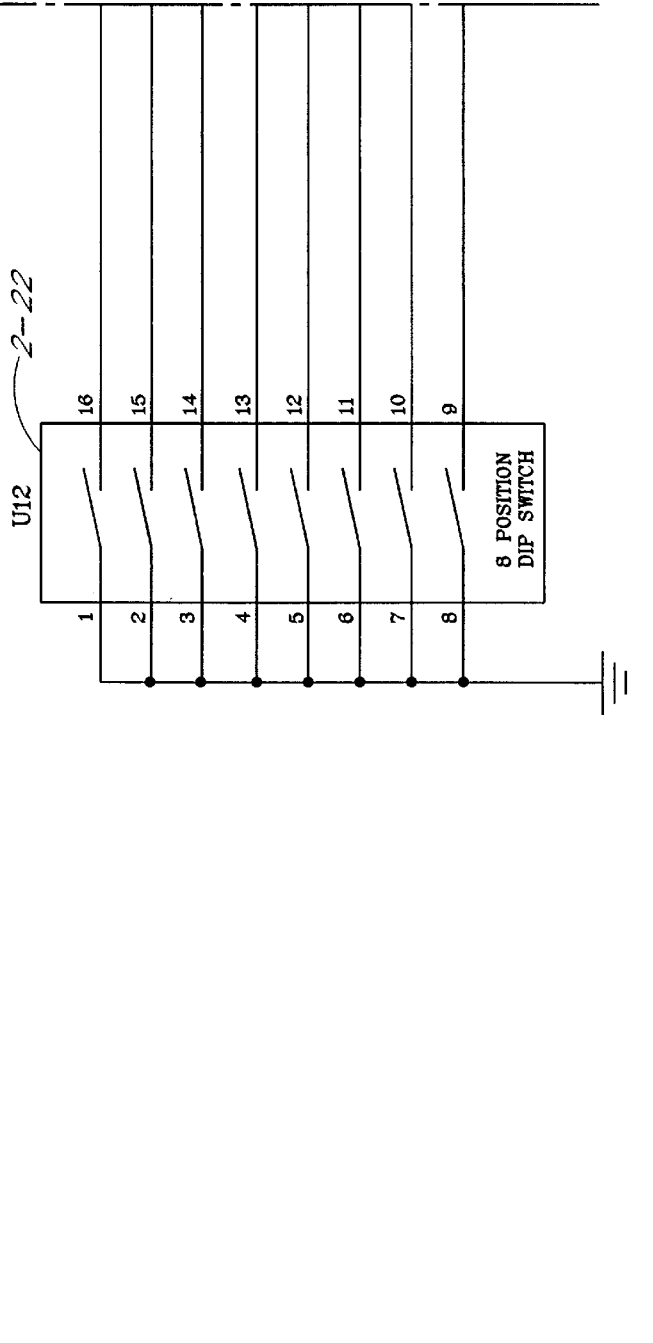
FIG. 3 is a schematic of a LAN to Repeater Interface.
Figure 3B:
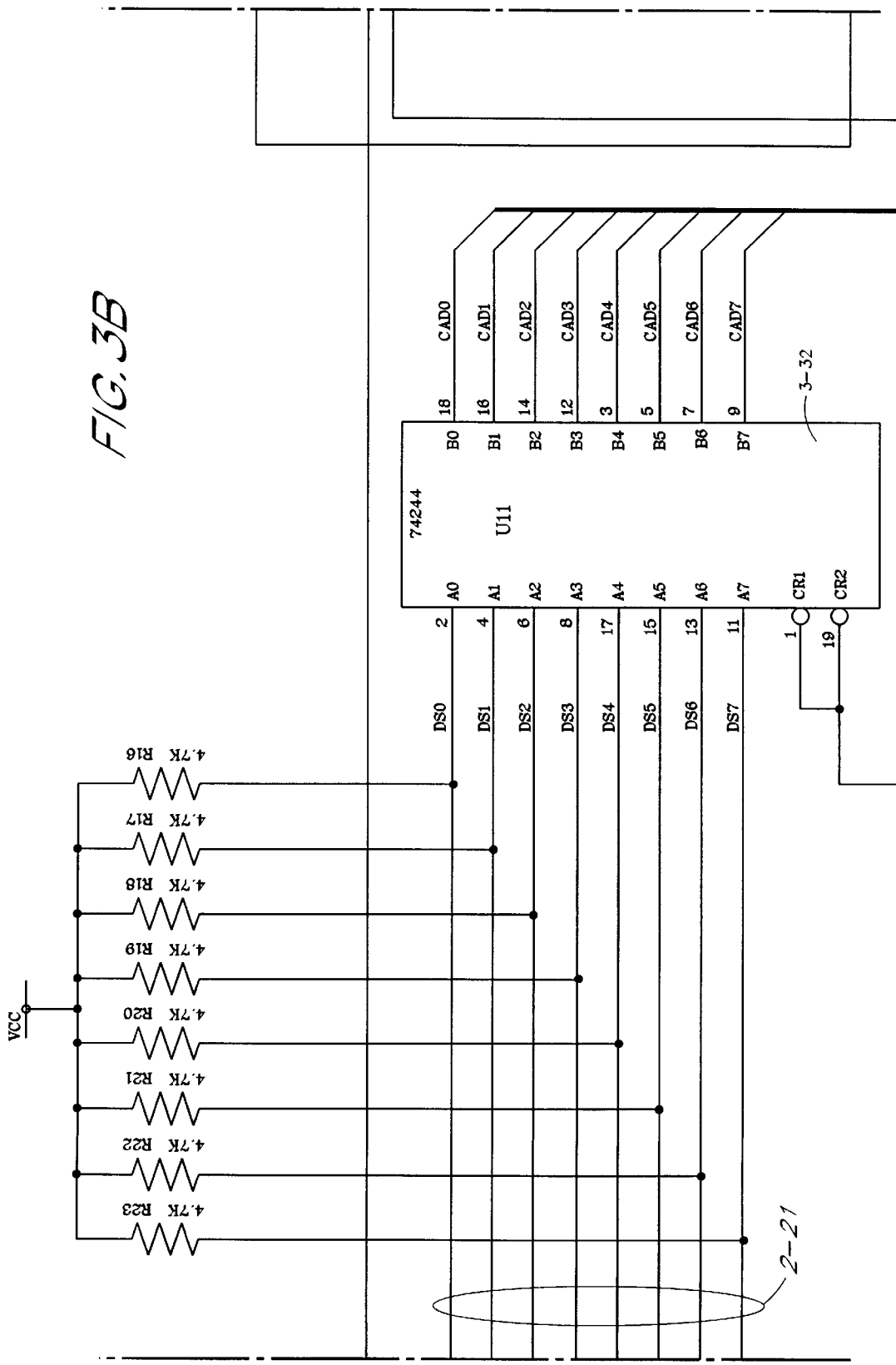
Figure 3C:
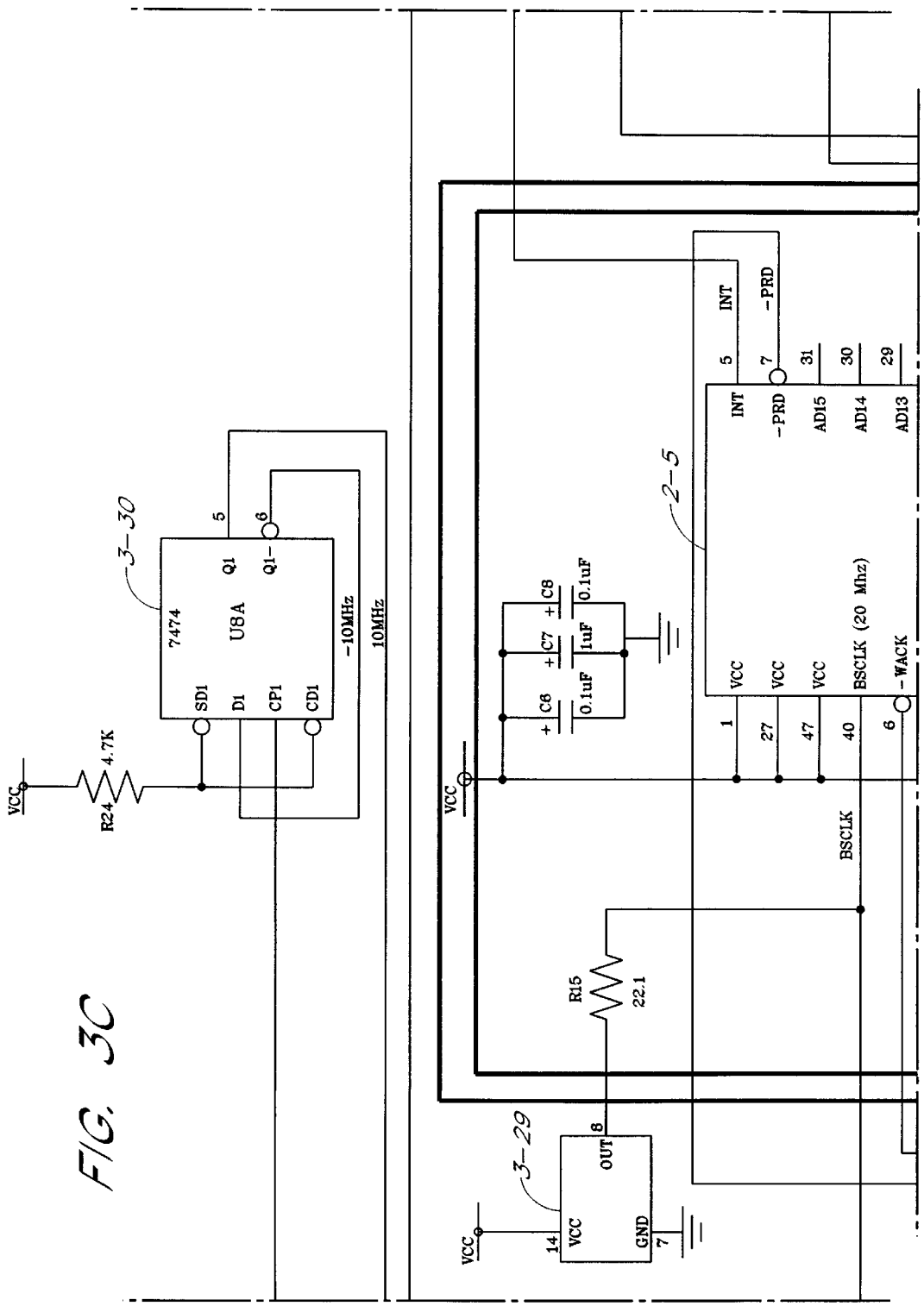
Figure 3D:
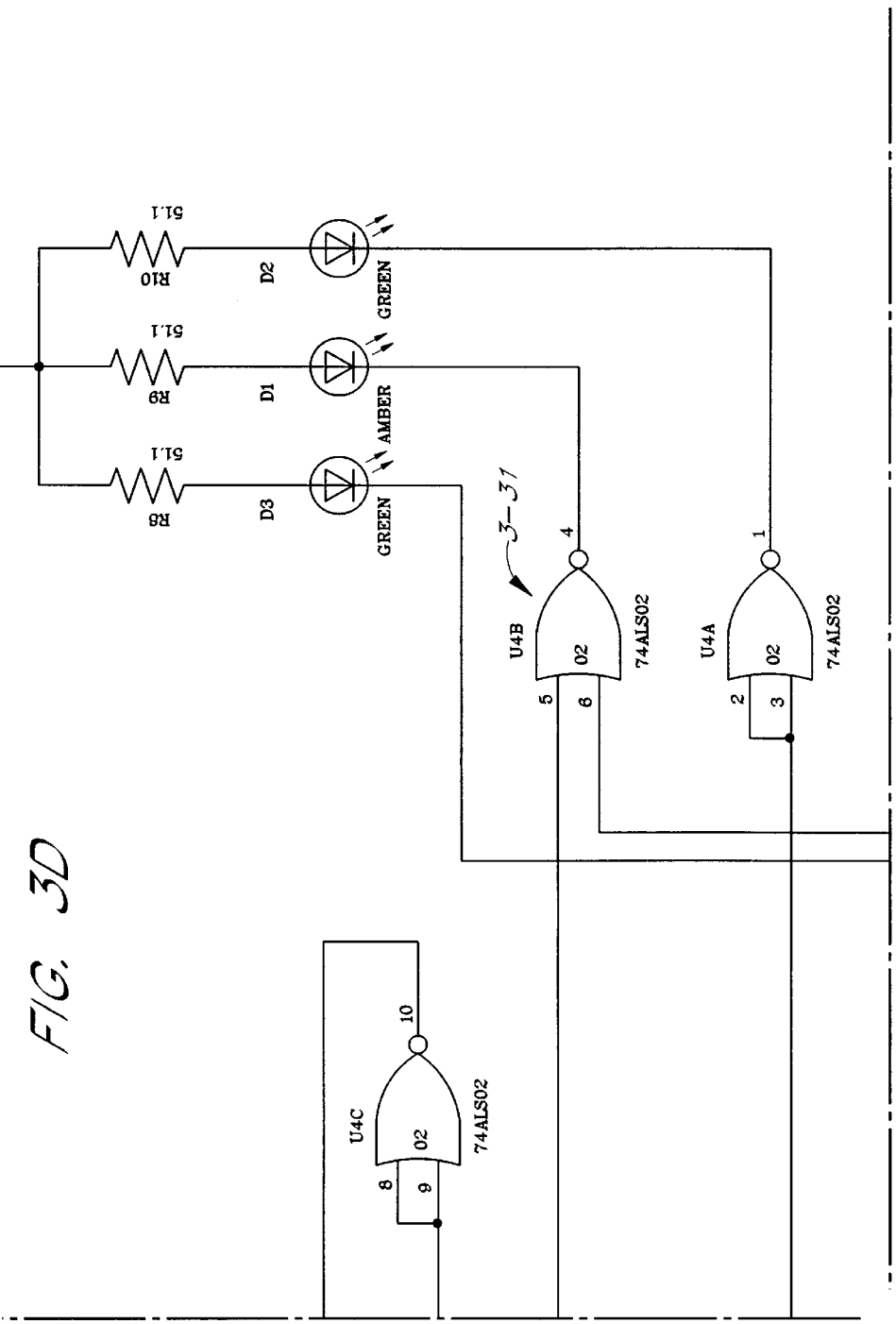
Figure 3E:
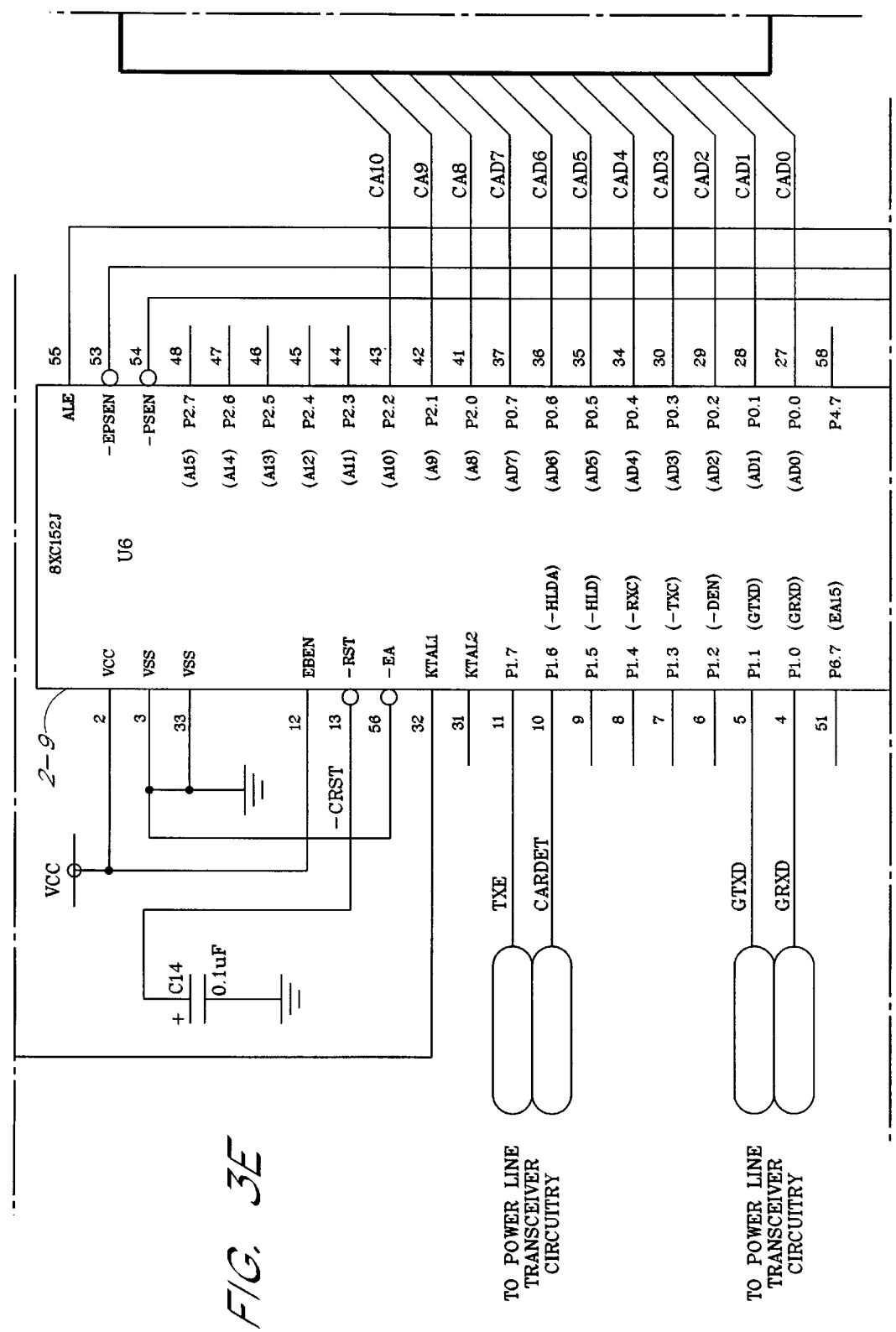
Figure 3F:
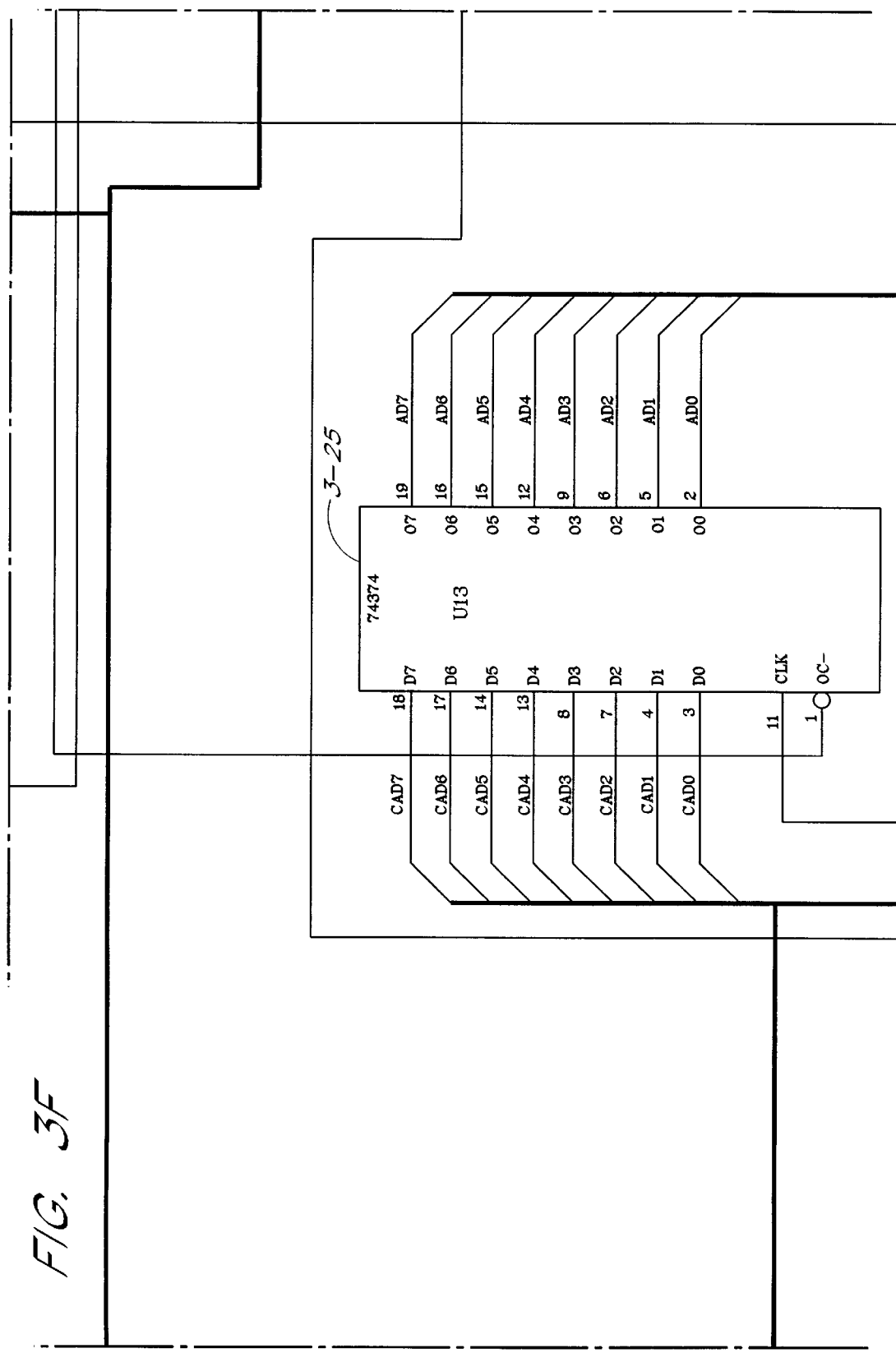
Figure 3G:
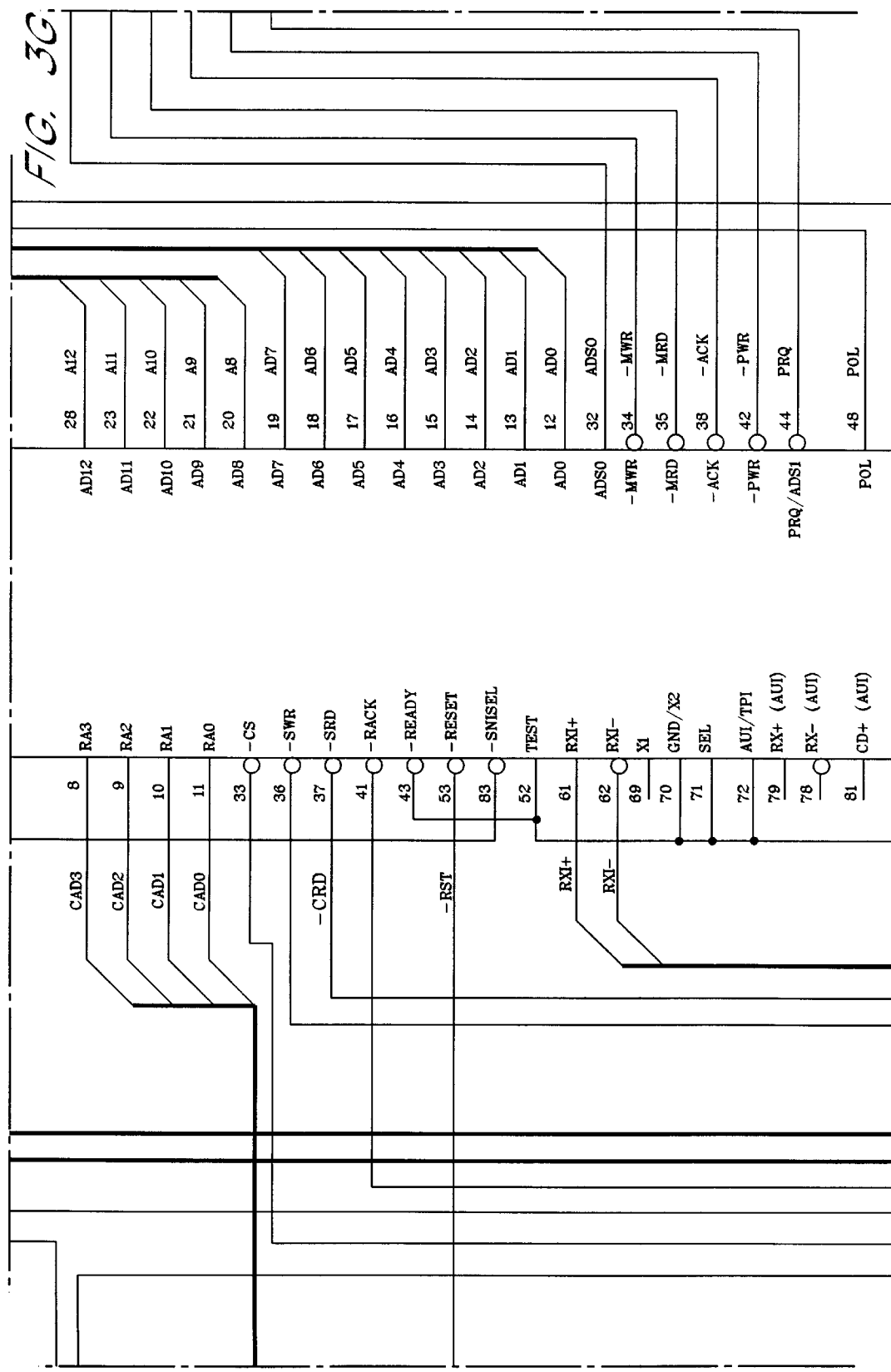
Figure 3H:
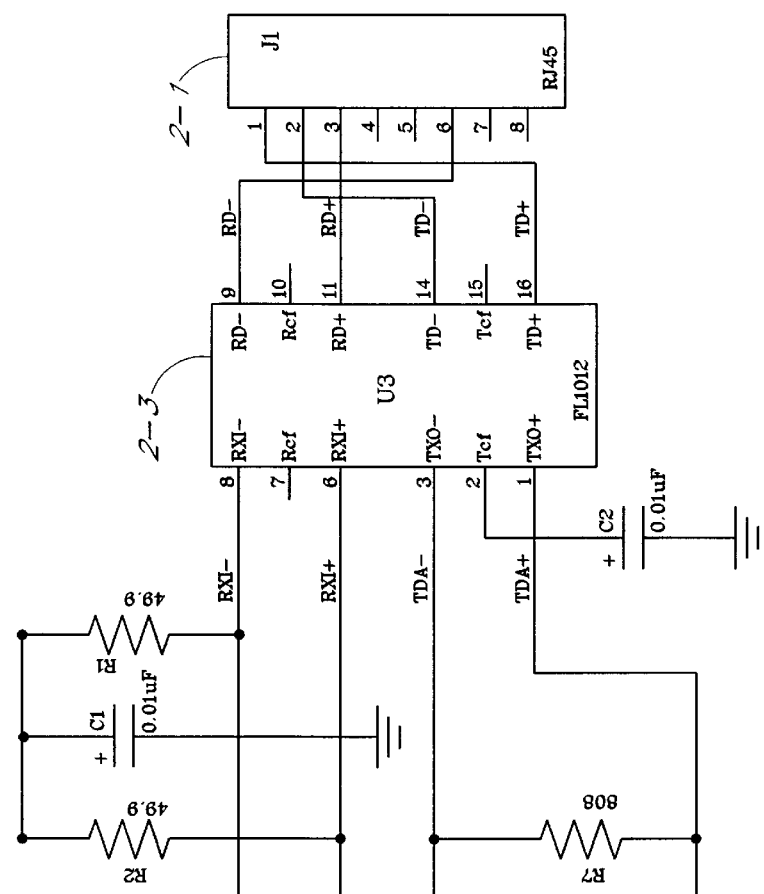
Figure 31:
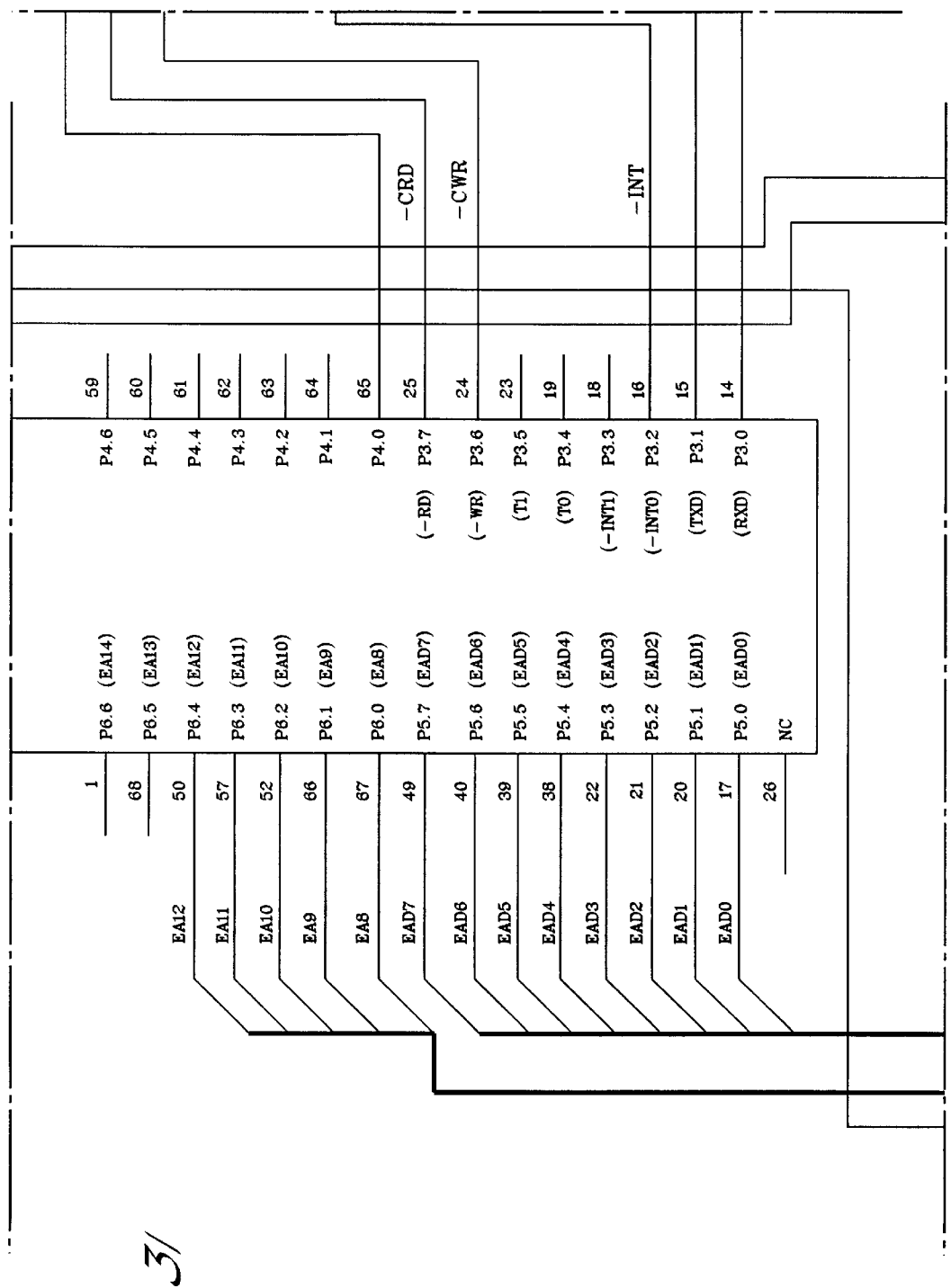
Figure 3J:
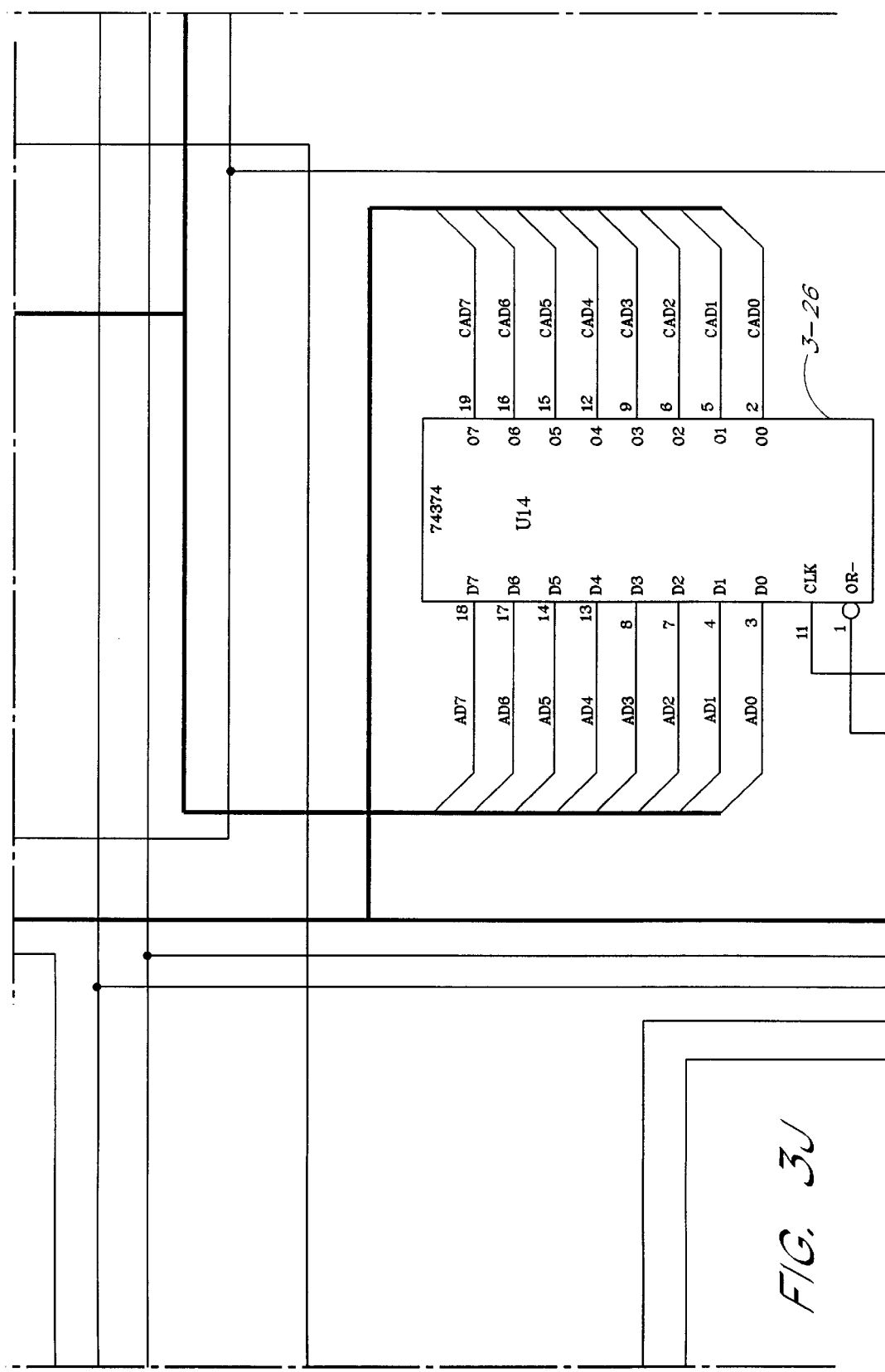
Figure 3K:
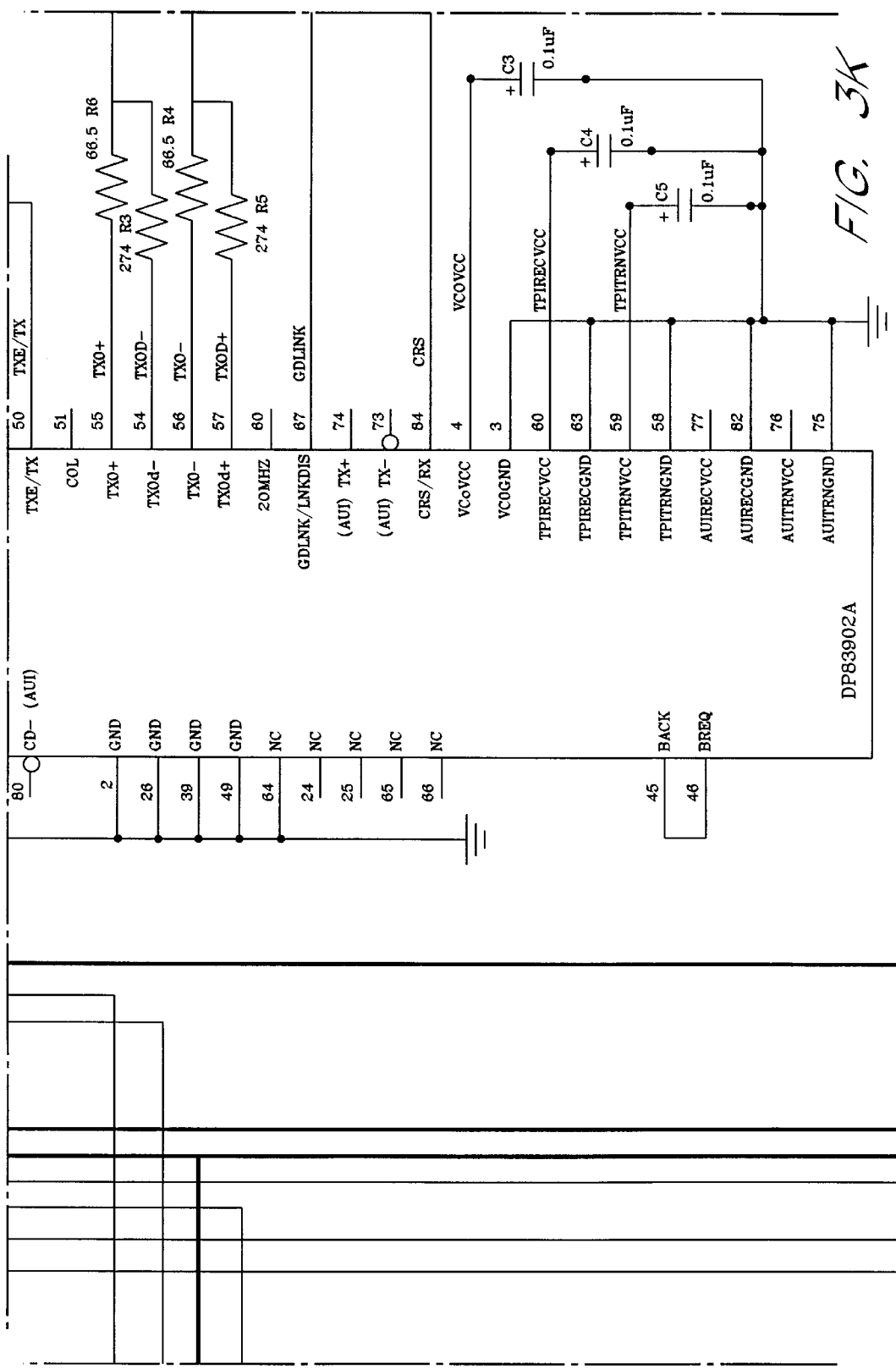
Figure 3L:
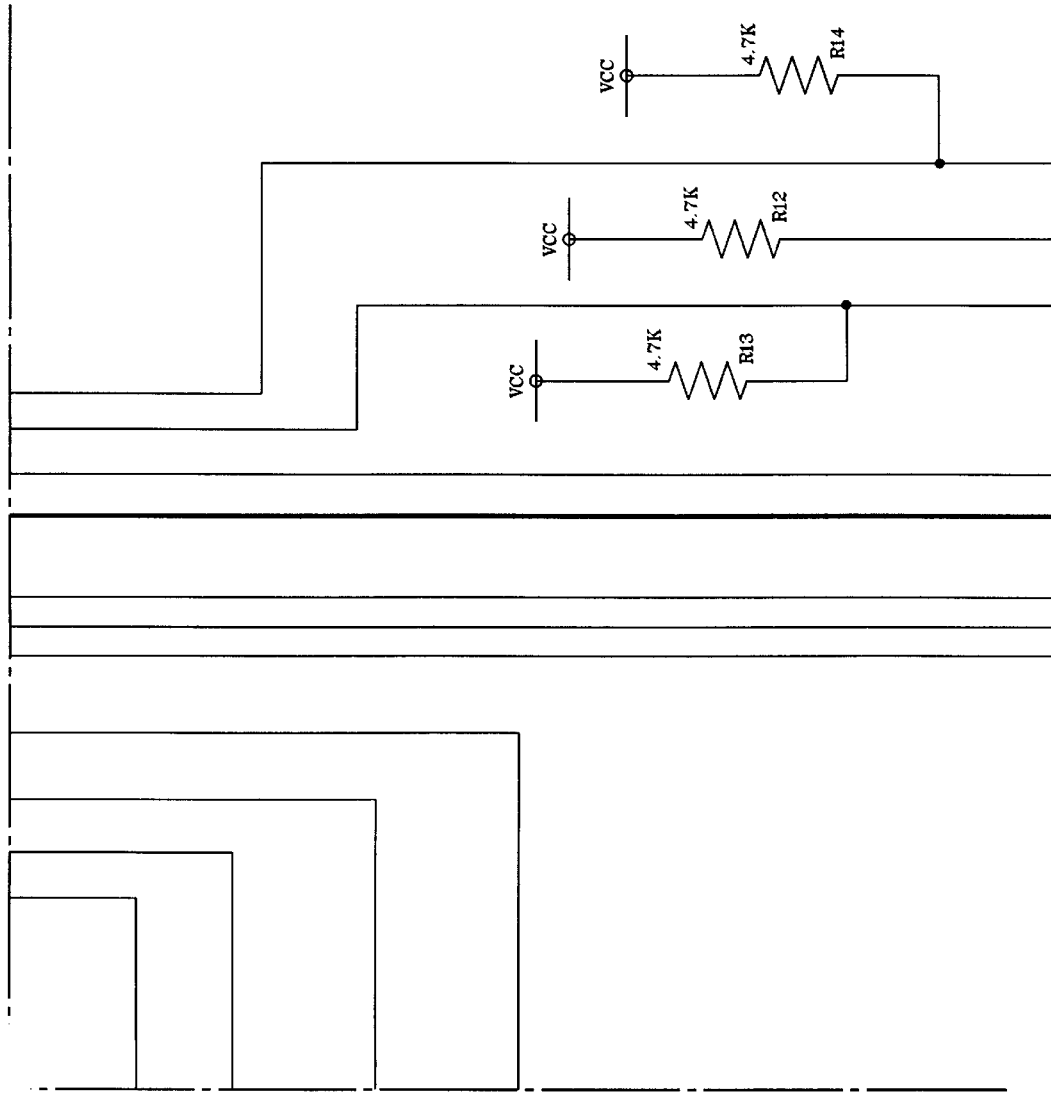
Figure 3M:
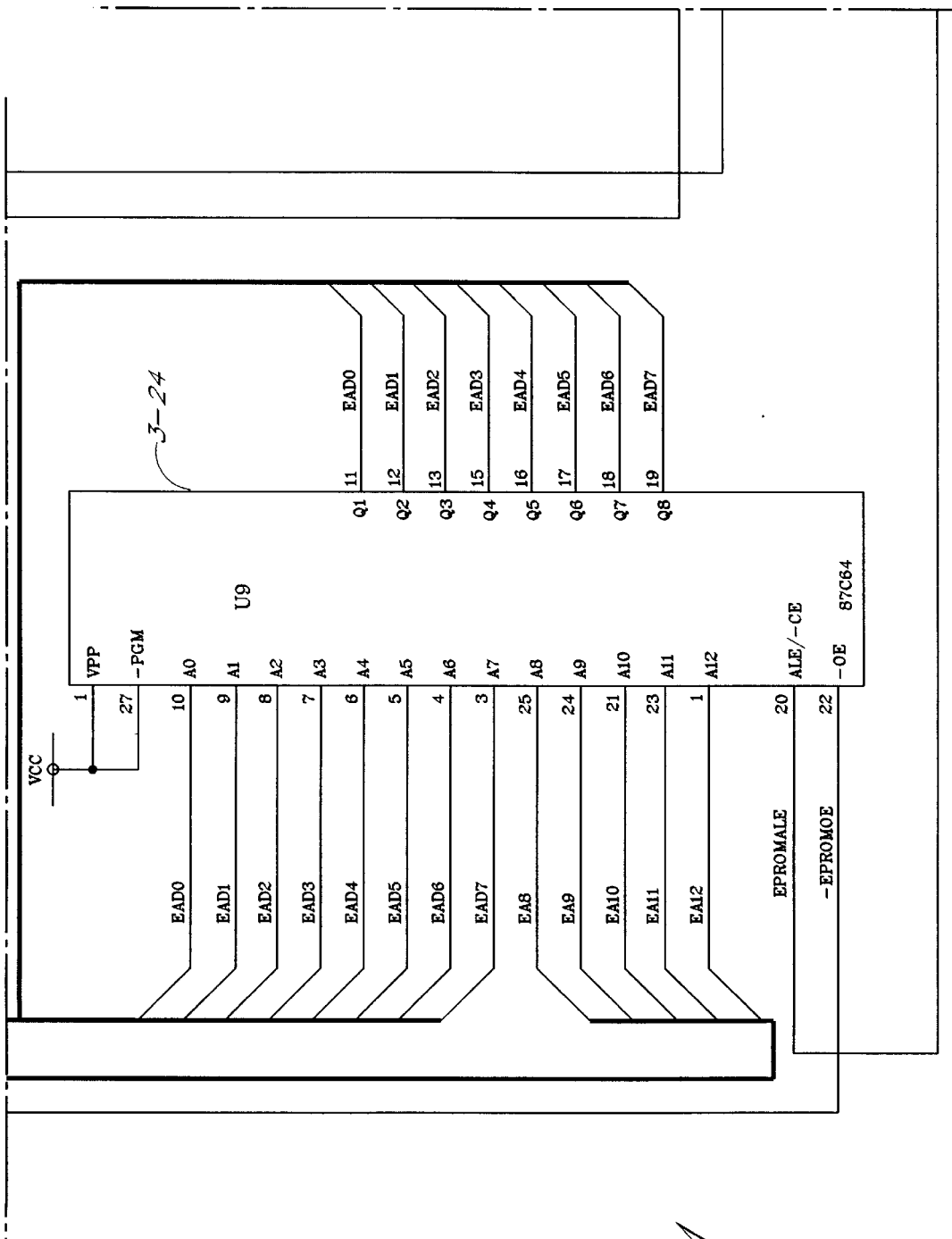
Figure 30:
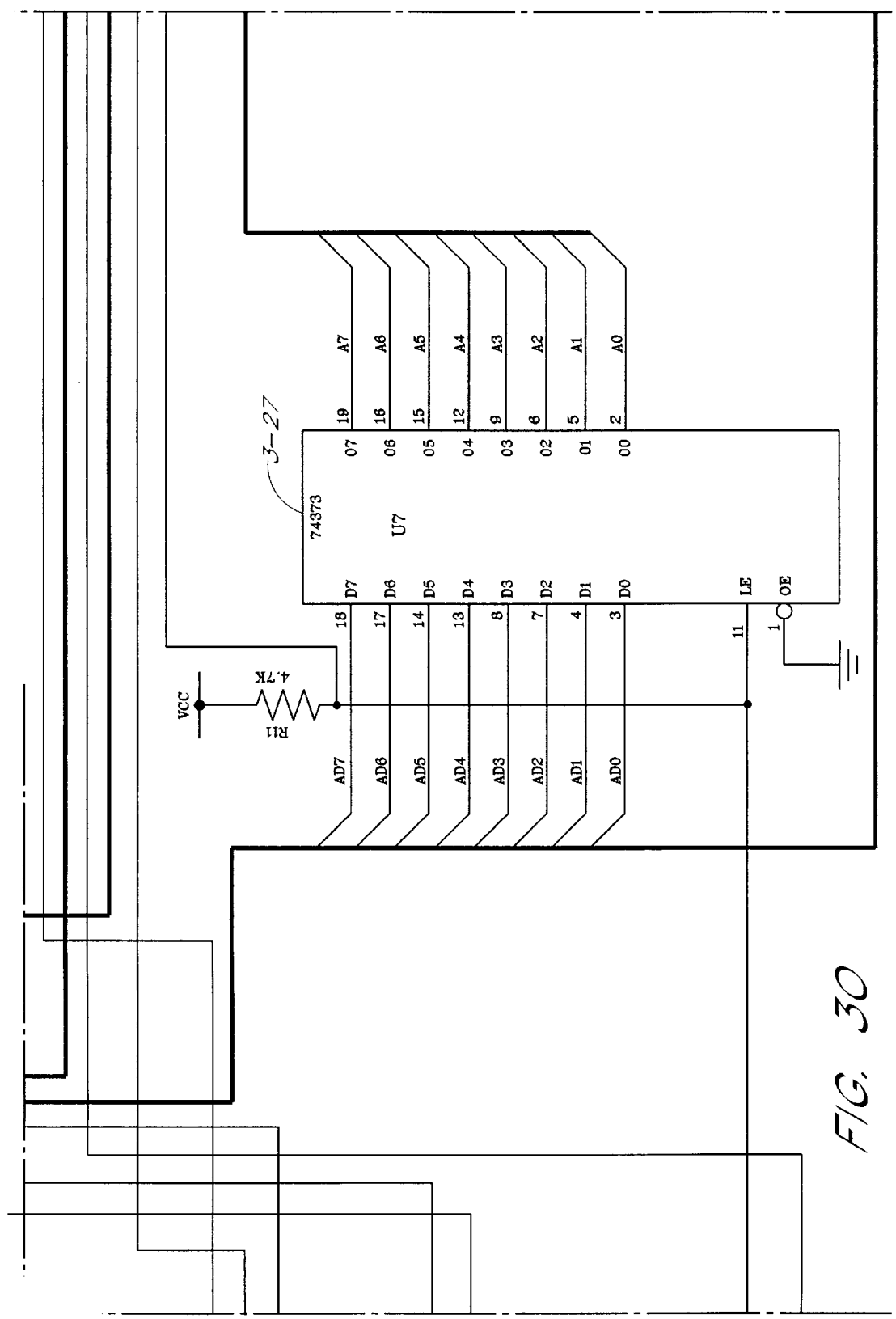
Figure 3P:
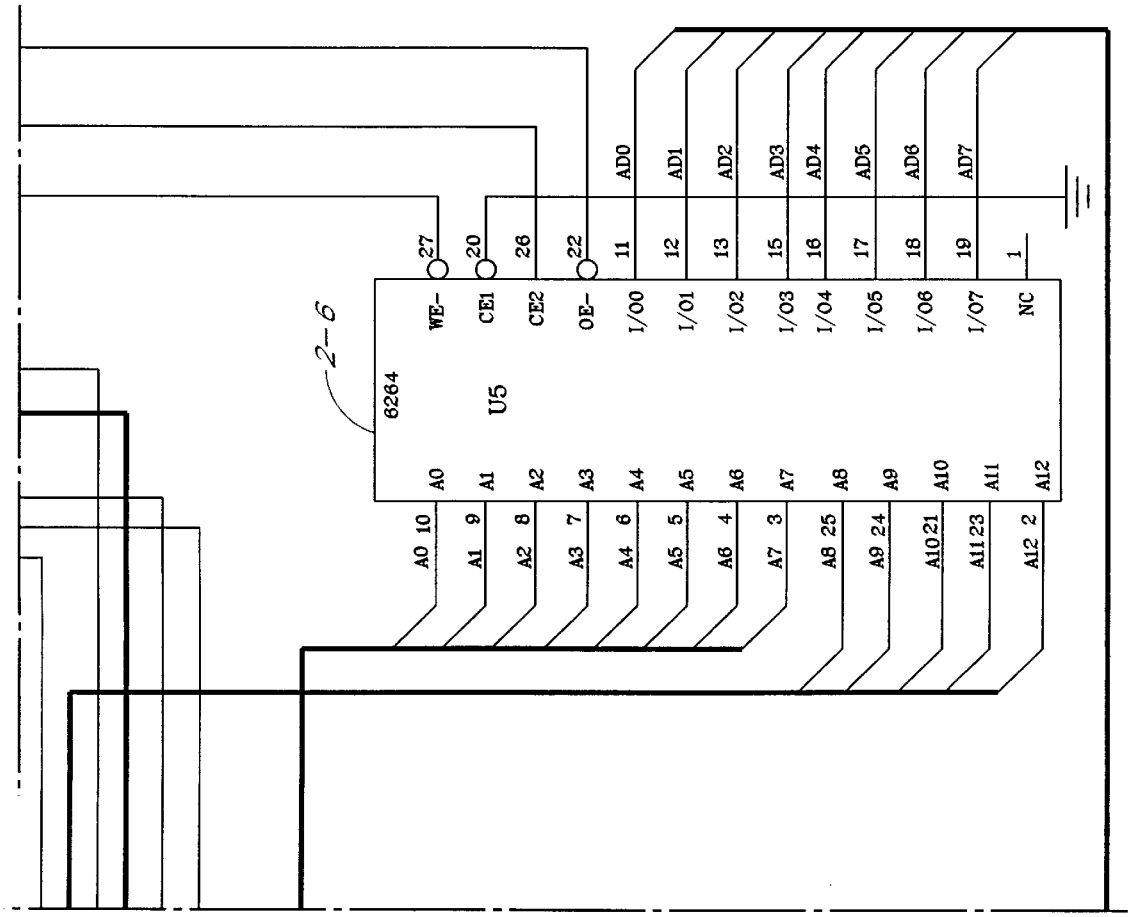
Figure 3Q:
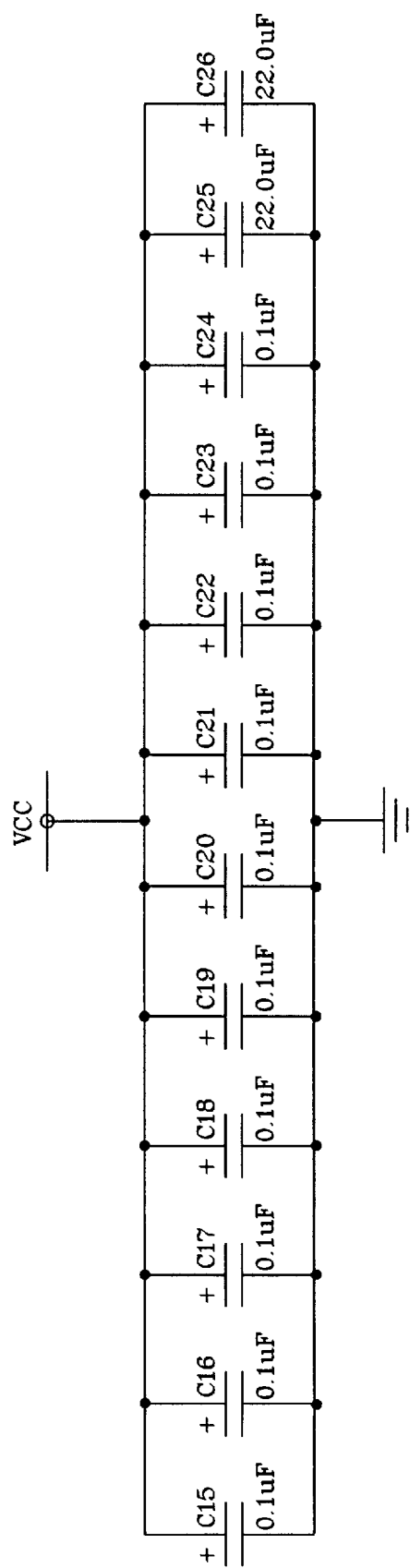
Figure 3R:
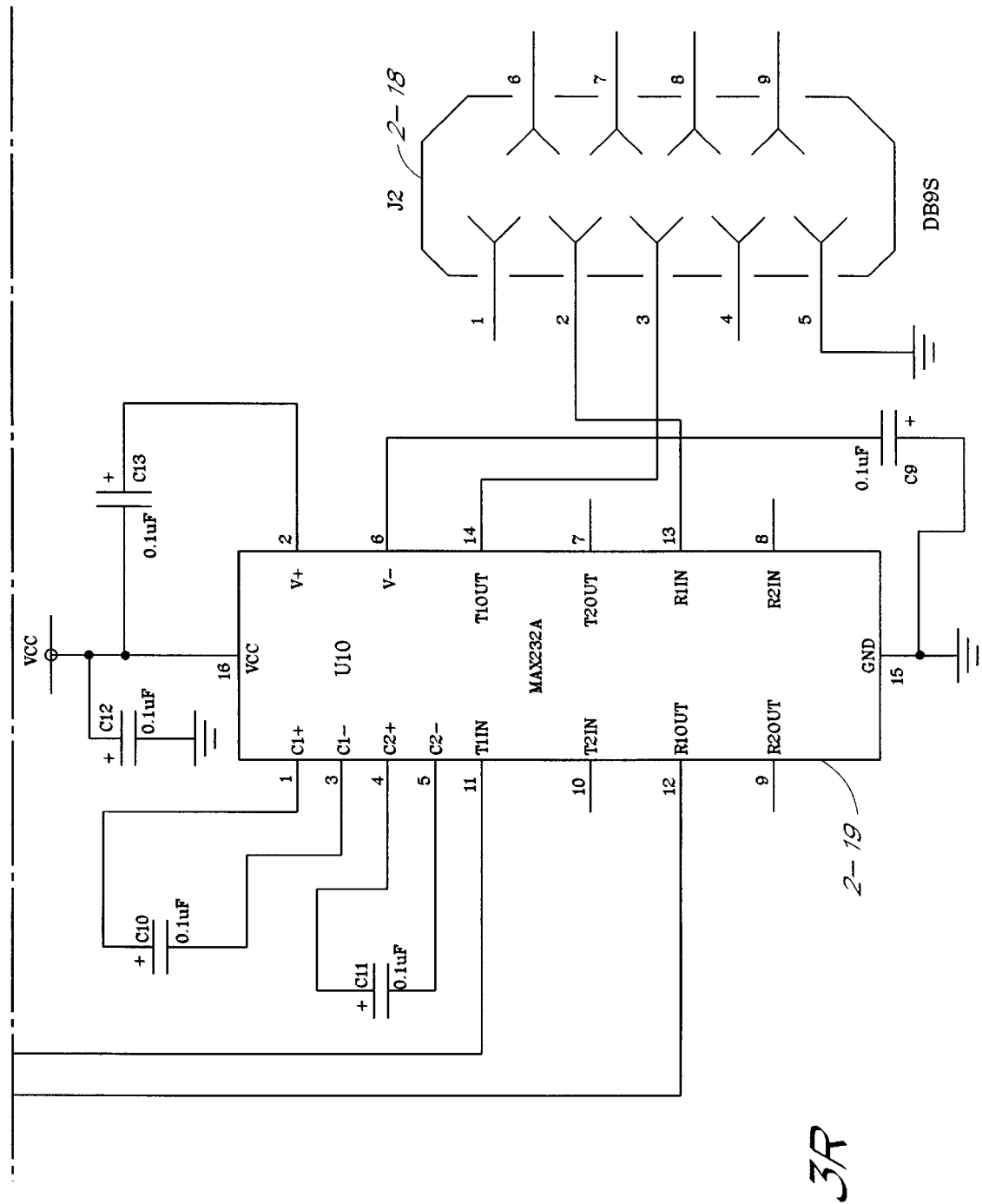
Figure 4A:
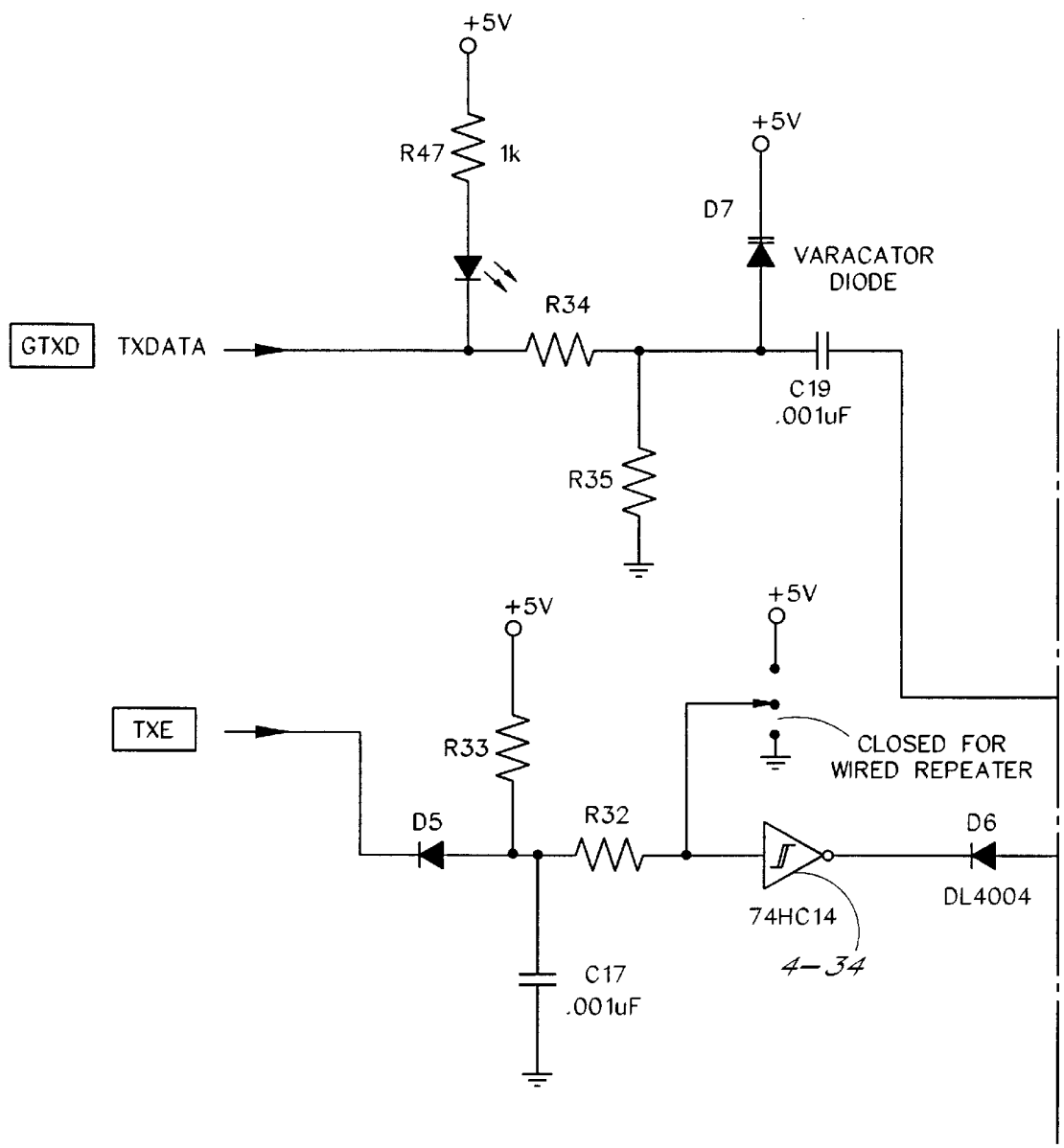
FIG. 4 is a schematic of a PLC Repeater Transceiver.
Figure 4B:
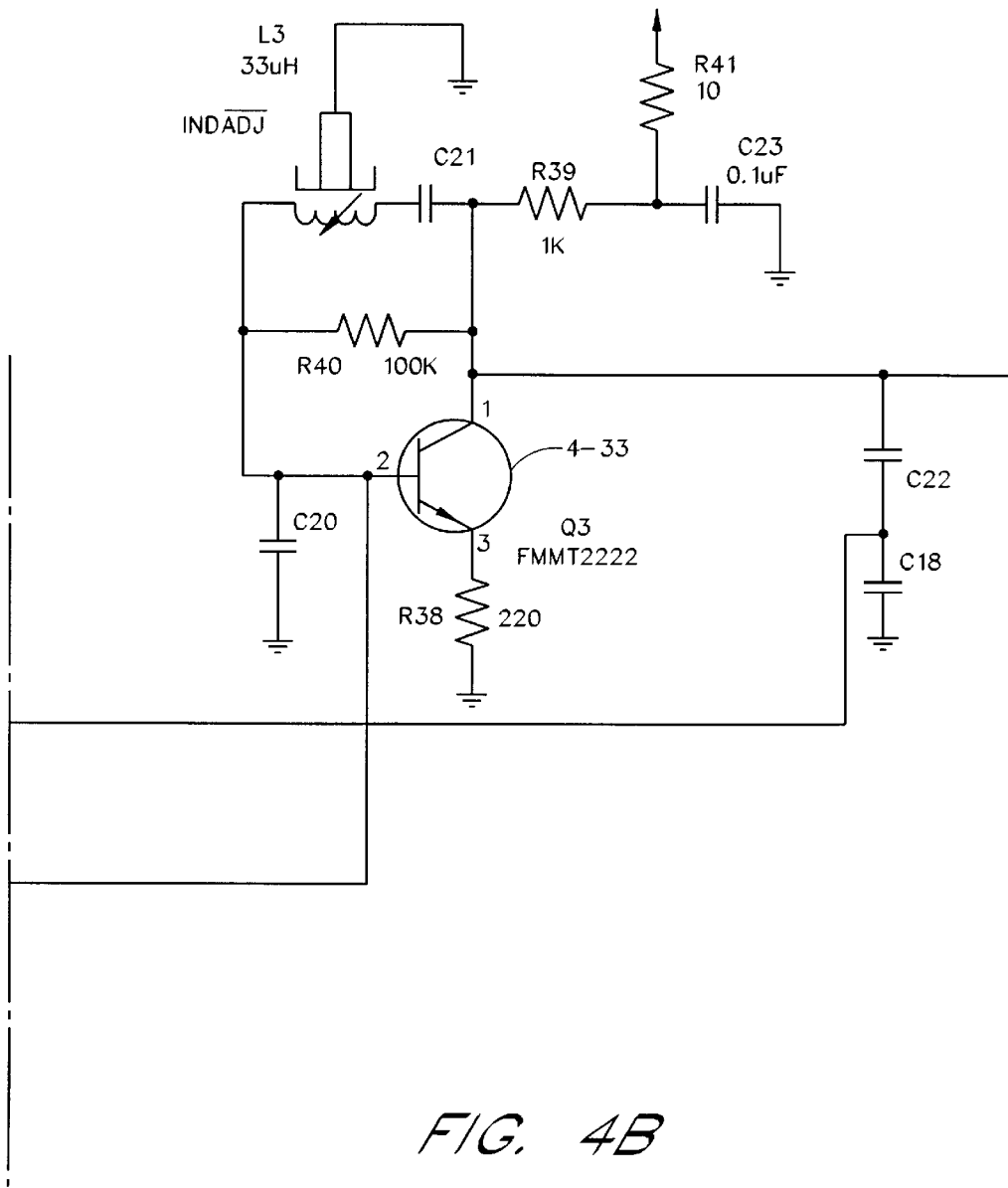
Figure 4C:
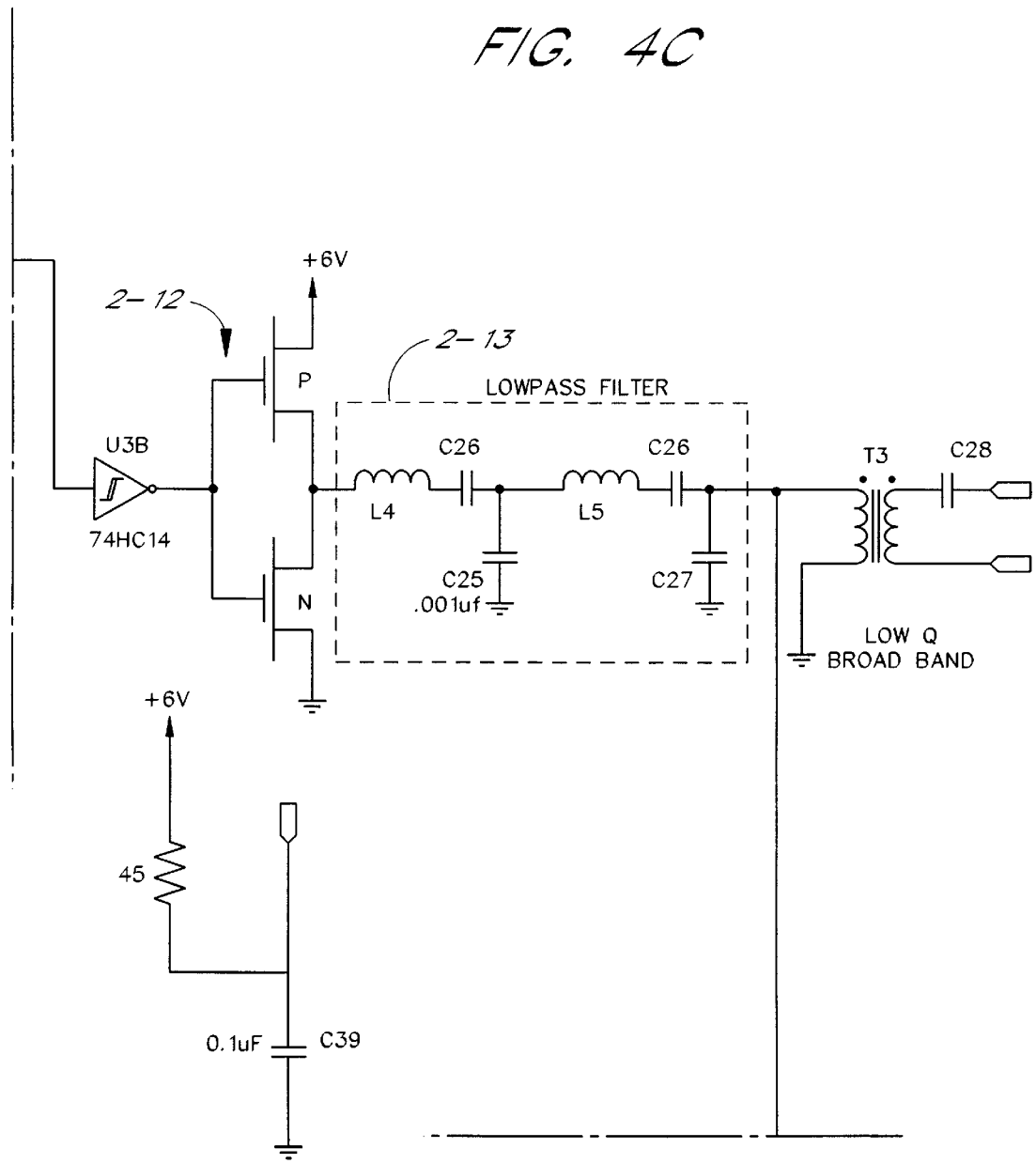
Figure 4D:
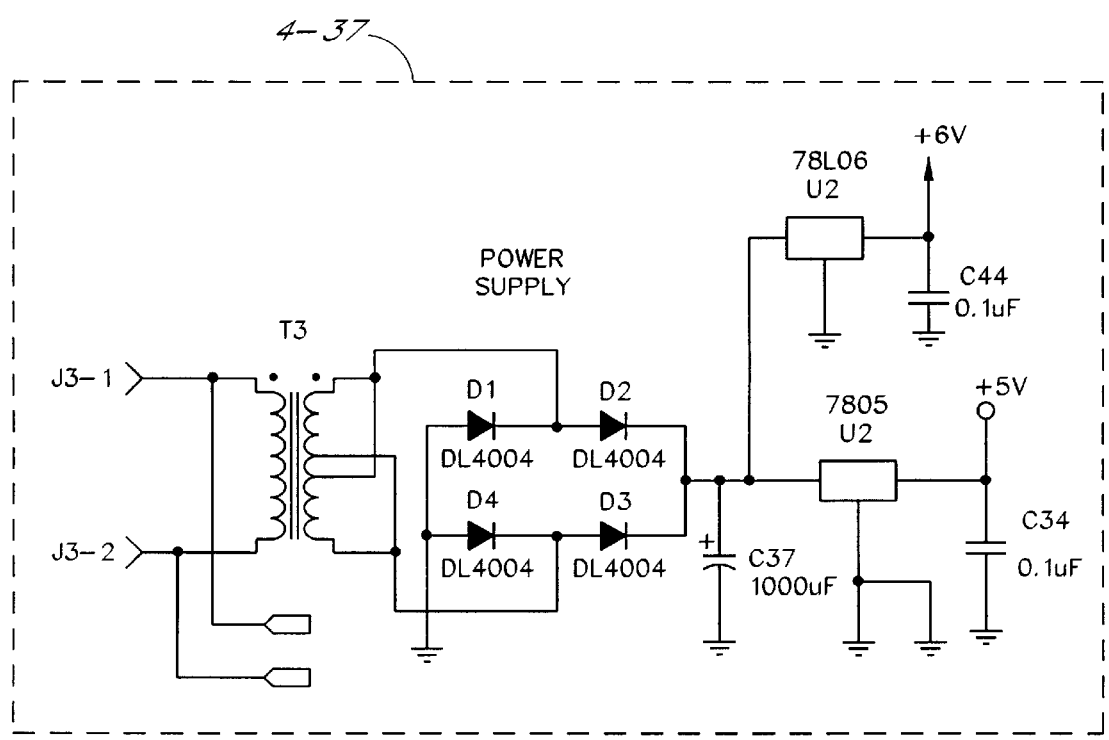
Figure 4E:
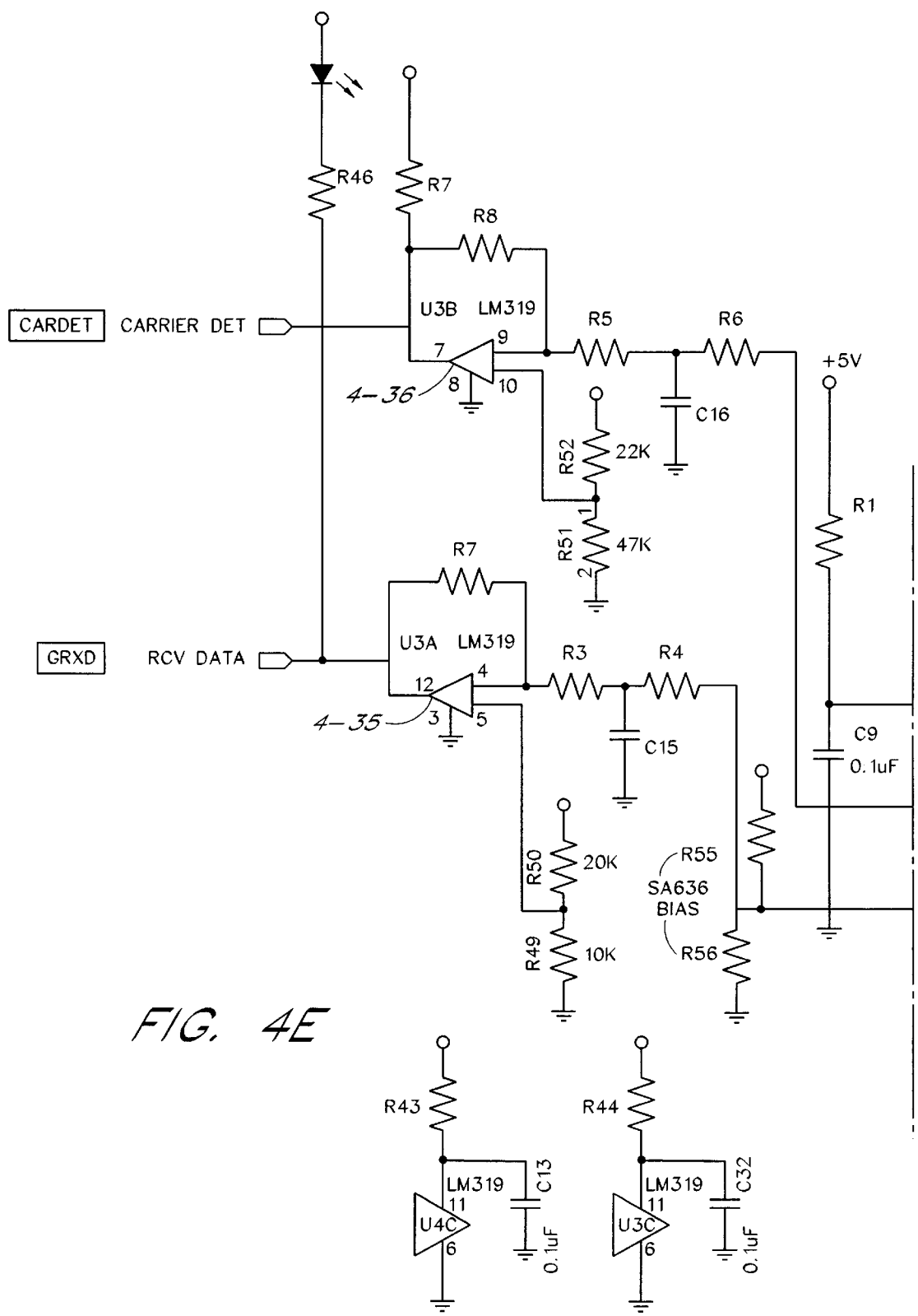
Figure 4F:
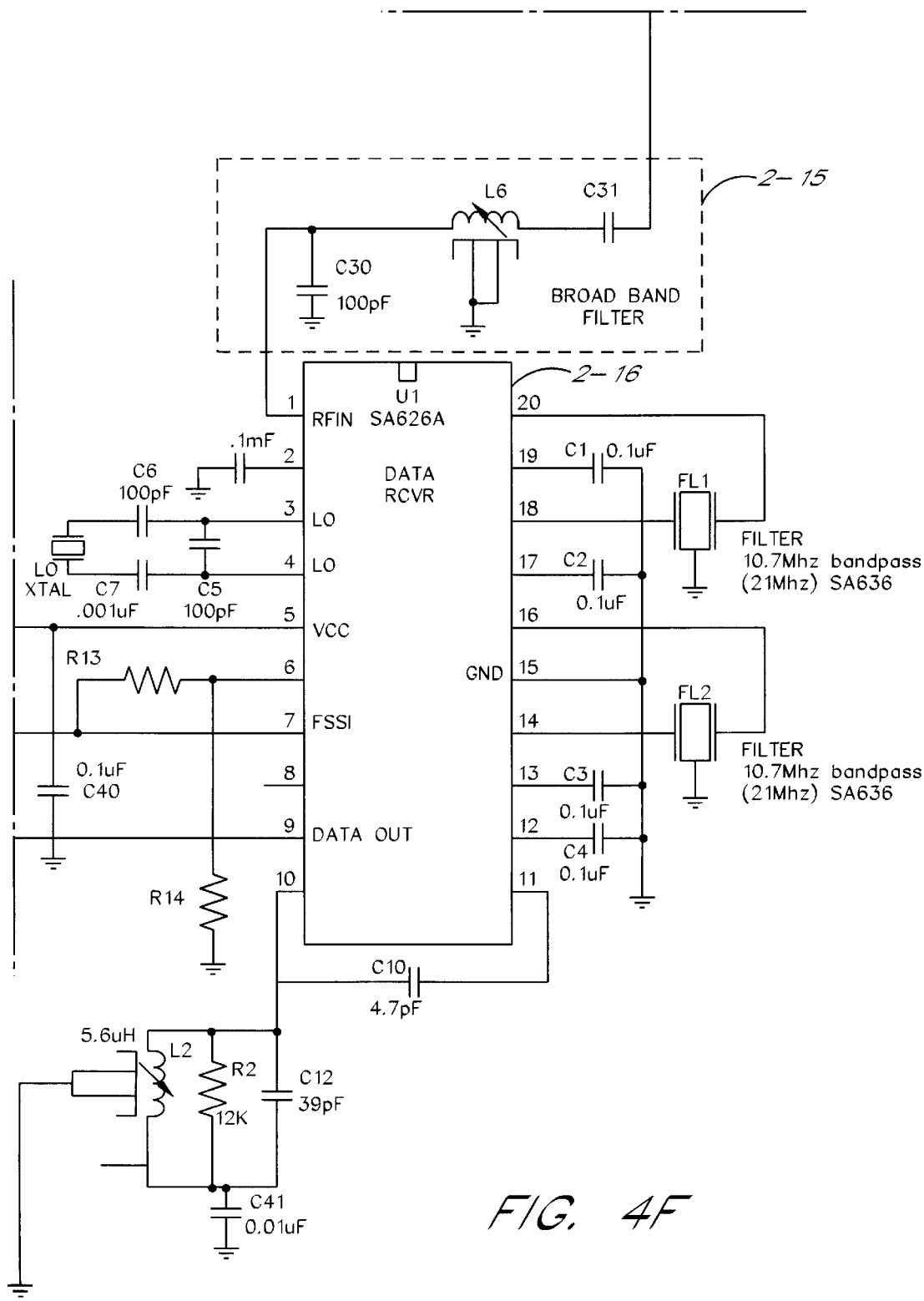

FIG. 2 is a block diagram of a LAN PLC Repeater 1-3. The LAN connection 1-2 to repeater 1-3 is made at RJ-45 connector 2-1, which is operably connected via connections 2-2 and isolator 2-3 to the differential transmit and receive ports 2-4 of LAN interface IC 2-5. Network Interface Controller (NIC) 2-5 (data sheets may be found in National Semiconductor's *Local Area Network Databook*, incorporated by reference) is a generic multiple sourced part which is common to most sophisticated LAN networks and contains the hardware registers, connections and logic/firmware to transmit and receive high bit rate LAN signals with standardized preambles, packet sizing and CSMA/CD collision arbitration. A standard RAM (Random Access Memory) 2-6 of sufficient size is operably connected to NIC 2-5 via memory address and data bus 2-7 to store incoming and outgoing data packets: 1) incoming packets which have been received from LAN connection 1-2 and are waiting to be transmitted further by $\mu$C 2-9 and 2) outgoing packets which were received by $\mu$C 2-9 and are waiting to be transmitted back through LAN connection 2-1 to the network 1-2 or LAN card of a workstation 1-1. The repeater is controlled by $\mu$C 2-9, which is operably connected to NIC 2-5 via control, data and address lines 2-8, permitting the $\mu$C 2-9 to setup and control the NIC 2-5 and transfer data packets bidirectionally into/out of the packet buffer 2-6. In addition, $\mu$C 2-4 has communication ports, both parallel and serial, for communicating LAN data with wired and/or PLC interfaces. Some commercial $\mu$C's, such as the Intel 83C152 (an 8031 derivative, data sheets for which may be found in Intel's 8 *Bit Embedded Microcontroller Handbook*, incorporated by reference) contain high speed Global Serial Channels (GSC) 2-10 which are capable of 0.1–10 Mbps serial data transfer with CDMA/CD protocol registers and firmware at a reasonable cost, which facilitates data I/O for a high speed PLC transceiver (2-11 through 2-17 or FIG. 4), which is operably connected to the global serial channel 2-10. Transmit data TXD from the incoming packet buffer 2-6 modulates an RF carrier at modulator 2-11 which drives transmitter 2-11, which transmitter is operably connected to the power line bus 1-4 via Filter 2-13 and RF coupler 2-14. Transmitter 2-11 is turned ON by transmit enable TXE only when data is transmitted, thus reducing the RF traffic on the AC line 1-4 during latent periods. Data receiver 2-16 is operably connected to AC bus 1-4 via RF coupler 2-14 and filter 2-15. Data modulated RF from similar repeaters carried by power line 1-4 is received by the receiver 2-16, buffered by high speed comparator 2-17 and transferred as RXD to global serial port receiver 2-10 where $\mu$C 2-9 screens the preamble for ID codes/addresses and arbitrates the data for transmission on to the LAN interface. Unique ID codes or repeater addresses may be either manually entered by dipswitch or automatically assigned by network supervisory software under automatic or user control. For example, manual entry ID code switches 2-22 operably connect to a port of the $\mu$C 2-9 via lines 2-21, and may be used to uniquely identify address and security bytes in preambles and/or determine arbitration backoff delay times. etc. Factory burned ID codes can also be obtained with specialty or ASIC designs.

FIG. 2 also illustrates alternate LAN and data sources for the PLC repeater. The $\mu$C 2-9 provides a standard serial comm port 2-20 which connects to a serial port interface 2-19 and connector 2-18, configuring repeater 1-3 into an RS-232D LAN repeater, in which the PLC data transceiver operates at substantially higher data rates (than the 115.2 Kbaud RS-232D) to unburden the AC power bus 1-4 LAN. (The Network Interface Controller and associated parts would be removed, if unused in this alternate embodiment.) In some network configurations, a parallel port interface components could be operably connected in place of serial components 2-18 and 2-19 to a parallel port on $\mu$C 2-9. Alternately, the GSC port 2-10 could be operably connected to an RS-485 LAN via a 2-19 interface like the LTC490, while the μC serial port 2-20 TxD and RxD lines could be operably connected to the TXD and RXD I/O 2-11 and 2-17 of the PLC transceiver. In its simplest embodiment, the TxD and RxD lines 2-20 may be operably connected to TXD and RXD lines 2-10, providing a repeater requiring no μC; PLC transmitter 2-12 and receiver 2-16 have been operated simultaneously on different carrier frequencies to provide full duplex serial operation, if required by the LAN application. Alternately, the transmitter in a no μC system may be enabled only when data is transmitted, to permit PLC LAN operation with a single frequency.

FIG. 3 presents a detailed working schematic of the LAN interface and 10 Mbps to 1 Mbps converter. J1 2-1 is the RJ-45 connector to the LAN line/card of a workstation. U3 2-3 is the Isolator/Filter for Ethernet 10 Mbps lines. U1 2-5 is the NIC chip, a National DP83902A, the complete specs for which are found in National Semiconductor's *Local Area Network Databook,* already incorporated by reference, which also contains comprehensive documentation on the Ethernet IEEE 802.3 standard. Several Network Interface Controllers are available from various manufacturers for Ethernet as well as other popular network standards, such as Arcnet and Token Ring, which may be operably connected to μC U6 2-9 in place of Ethernet NIC 2-5 and the corresponding connectors 2-1 through 2-4. Referring still to FIG. 3, an 8 Kbyte RAM packet buffer U5 2-6 is operably connected via address latch U7 3-27 to the memory address and data ports of NIC 2-5. The size of buffer 2-6 may be enlarged or reduced somewhat to accommodate network data capacity, system operation and budgetary constraints. Repeater μC U6 2-9 is operably interfaced with NIC U1 2-5 via latches U13, U14 3-25 & 3-26 and PAL U15 3-28. The timing diagrams and PAL 3-28 logic diagram are appended herewith in Appendix B. Additional functions include 20 MHz clock 3-29, 10 Mhz divider 3-30, status drivers 3-31 and status indicators D1, D2 and D3. While one enabling embodiment has been represented, those skilled in the art will appreciate that other approaches and simplifications can be implemented without departing from the method presented herein.

Referring to FIG. 3 again, the μC 2-9 may contain masked ROM firmware or may be operably connected with external Eprom U9 3-9 for development purposes. A pseudocode listing follows:

LAN PLC REPEATER PSEUDOCODE FLOW SHEET
RESET ON POWER UP
STARTUP SEQUENCE

'Initialize μC sets up the communications registers for Manchester 'Encoding with CSMA/CD. A 16 bit CRC is selected and the preamble 'is set to 8 bits. The serial rate is set to 1.25 Mbps.

INITIALIZE μC

GMOD Register
      Select Manchester Encoding
      Select CSMA/CD
      Enable CRC, Select 16 bit CRC
      Set preamble to 8 bits
    Baud Register
      Set serial rate at 1.25 Mbps
    Disable all interrupts
    Enable receiver
    Set transmit status register to normal operation
    Set address mask registers to don't care state
    Initialize SLOTTM (slot time register) to 2 μS 'Initialize NIC divides the 8K buffer into 2 Xmit buffers and 20 '256 byte pages for the receive ring. Data is handled a byte at a 'time and the FIFO to receive buffer ring occurs 8 bytes at a time. 'The CRC is appended by the transmitter. The receiver rejects 'errored packets. All valid packets are received.

INITIALIZE NIC

Setup 8K xmit/rcvr buffer
    Setup 2 Xmit buffers of 1536 bytes each
Set remaining 5120 bytes as receive buffer ring
SETUP NIC REGISTERS:

Data Configuration Register
      Byte wide DMA transfer
      Normal operation
      FIFO set to 8 bytes
    Transmit Configuration Register
      CRC appended by transmitter
      Normal operation
      Normal backoff
    Receive Configuration Register
      Reject packets with receive errors
      Reject packets with fewer than 64 bytes
      Accept broadcast packets
      Accept all packets (promiscuous mode)
      Buffer packets to memory 'The μC Receive Routine keeps track of the current NIC transmit 'buffer then loads that buffer with data as it is received in the 'μC Receive FIFO.

RECEIVE ROUTINE: (μC ROUTINE for μC to send data to NIC)

Choose free NIC transmit buffer
    IF NIC transmit buffers full, THEN
      discard receive and GOTO TRANSMIT
    Check Receive FIFO for Not Empty (NE) flag on μC
    Read byte from Receive FIFO
    Check Receive FIFO NE Flag on μC
    IF FIFO Empty, THEN validate byte (No collision packet byte)
      IF transmit pending, THEN
        Restart backoff
      ELSE GOTO RECEIVE ROUTINE:
    ELSE GOTO READ ROUTINE (Valid Data Packet)
    READ ROUTINE: Write byte to NIC transmit buffer
      Read FIFO data buffer
      Check Receive FIFO NE flag
      IF NE flag asserted, THEN GOTO READ ROUTINE
      ELSE write last data byte to NIC transmit RAM
        (Packet has been read and written to NIC)
      Check receiver for receiver errors
      IF no errors, THEN
        Instruct NIC to transmit Packet
      ELSE discard packet
      GOTO TRANSMIT 'The μC Transmit Routine checks its Global Serial Channel (GSC) for
    'a not busy state. If the GSC is not busy then the μC reads packet
    'data from the NIC and loads the TX FIFO.

TRANSMIT ROUTINE: (routine for μC to get data from NIC)

IF NIC has received a valid packet, THEN
      IF Global Serial Channel (GSC) is not busy, THEN
        Get pointer to received packet
        Read 2 bytes from NIC Save 1st byte (this is a pointer to the next received packet)
Read 2 bytes from NIC
Save these bytes in variable ByteCount
LOOP
    Wait for TX FIFO Not Full (NF Flag)
    Read 1 byte from NIC
    Write 1 byte to μC TX FIFO
    Decrement ByteCount
ENDLOOP (When ByteCount is zero)
ELSE GOTO RECEIVE ROUTINE An additional routine services AC PLC bus collision avoidance and access arbitration. The method requires each repeater (with data to send) seeking access to a particular frequency or channel of the AC LAN bus 1) to listen to the bus traffic and, upon detecting the termination of a third party transmission, 2) to wait a minimum of 20 μS plus a random additional time (in 5 μS increments) before transmitting a short access request. 3) Following the access request, the receiver listens for 15 uS and, upon detecting no other carrier, the repeater μC begins data transmission with confidence. The dipswitch 2-22 may be used to provide a unique backoff or wait time for each repeater in addition to providing a unique IC code/address. Those of skill in the art will appreciate that the controller 2-9 may be configured to perform control functions such as attaching and removing data preambles and addresses, reformatting data, encrypting and decrypting data, and providing alternate data communications ports.

The universal interface capabilities of the controller 2-9 with its parallel and serial ports provides the capability for embedding the PLC repeater in computers and equipment with embedded controllers which already connect to the AC power system of a premises, thereby networking the equipment with other similarly equipped devices and users simply by connecting the AC power. The physical size of such a system and its associated cost could be reduced by utilizing the existing embedded controller and its serial port as the repeater controller and merely interfacing it to a compatible embedded PLC transceiver. The embedded controller would require the addition of appropriate network arbitration and control software/firmware. State-of-the-art design and manufacturing techniques reduce size and cost of repeater systems to attractive marketing levels.

Referring now to FIG. 4, a versatile PLC data transmitter and receiver are shown which provide DC to 2 Mbps data rates. No Manchester or other encoding is required. Wideband data or analog signals may be transferred in original form. The data interface of the transceiver comprises four data lines: a transmit data input line GTXD, a transmitter enable input line TXE, a receive data output line GRXD and a carrier detect output line CARDET. These lines correspond to their counterparts at the Global Serial Channel 2-10 of the μC 2-9. GTXD data voltage levels are coupled to varactor diode D7, which is capacitively coupled to the frequency determining components C18 and C22 at the low impedance port of oscillator 2-11, of which transistor Q3 4-33 forms the active element. Changes in reverse voltage across D7 result in corresponding inverse changes in the junction capacitance of D7 which change the resonant frequency of oscillation determined by L3 and the combination of C18 with the other capacitors C19 through C24. Driving the low impedance port of oscillator 2-11 at the collector of Q3 4-33 minimizes the negative impact of differentiated DC voltage shifts on the delicate bias of Q3 4-33, which DC shifts correspond to differentiated data coupled through capacitors C19 and C22. The output of Q3 drives a class D output stage 2-12, which efficiently drives the power line through filter 2-13 and RF coupler 2-14. The several stages of transmitter drivers buffer the oscillator 2-11 from AC line capacitance and load changes. A class A transmitter output may be employed to reduce harmonics but with decreased efficiency. The transmitter enable TXE circuit 4-34 connects to the base of Q3 4-33 through D6 to turn the oscillator 2-11 off. The circuit of 4-34 may be configured as an invertor (for operation from a controller) or as a resetable monostable multivibrator (for enabling the transmitter only when data is presented to the data input).

FIG. 4 also shows a data receiver 2-16 which is coupled by 2-14 RF coupler and filter 2-15 to the AC power bus. The filter 2-15 selects only the desired frequencies and matches the impedance of the AC line to that of the receiver input pin 1. The receiver 2-16 is a high performance superhet design with local oscillator, mixer, 2 stages of IF gain/filtering and limiter with quadrature detector, providing over 90 dB of RF gain with DC to 2 Mbps data response (Philips SA636 version). The receiver 2-16 local oscillator supports either 1) crystals, 2) LC oscillators or 3) external oscillator/synthesizers. Use of a synthesizer permits controller 2-9 selection of LO frequencies for FDMA and frequency hopping configurations. Receiver 2-16 has both a data output and a competent FSI (Field Strength Indicator) output, which are buffered by high speed comparators 4-35 and 4-36 such as LM319 or LM360. It should be noted that an analog buffer can be connected to the demodulated signal output (pin9) of the receiver 2-16 for recovery of wideband analog or composite analog/digital signals. The FSI CARDET output supports the RF carrier detect input of the repeater controller 2-9 for performing AC bus arbitration. The CARDET and GRXD buffered comparator outputs may be connected together in a wired AND configuration to provide data output only when BOTH the carrier is present AND data is present. The receiver 2-16 is so selective that multiple receivers and transmitters may be used simultaneously in a repeater to increase data rate, increase channels or network together AC power line LAN segments. The transmitter and receiver are fully capable of RF LAN operation which, in conjunction with the competent collision avoidance and arbitration, would provide competent RF LAN segments for many applications.

It should be noted that alternate commercial components of competent specifications can be used for the components specified herein. Although this invention has been illustrated in relation to a particular embodiment, it should not be considered so limited except by the appended claims.

What is claimed is:

1. A local area computer network repeater system for transmitting and receiving network data between repeaters, the system comprising a plurality of repeaters, each comprising:

means for coupling a local area network interface to a local area computer network or network segment for transmitting a bidirectional network data stream, said data stream having a bitrate of up to 2 megabits her second and a data bandwidth approximately equal to said bitrate;

means for frequency shift key modulating a transmission carrier with said network data stream and demodulating said frequency shift key modulated transmission carrier to recover network data, said frequency shift key modulated transmission carrier having an instantaneous frequency bandwidth which is not substantially greater than the greater of either about twice said data bandwidth or the frequency deviation of said frequency shift key modulation, said means comprising a receiver chip which utilizes at least one stage of gain and filter, and said means providing at least about 90 decibels of gain;

means for coupling bidirectional network data between said network interface and said carrier modulation and demodulation means; and means for coupling said transmission carrier to an AC power line to produce a power line carrier signal having a frequency in the range from about 2 to about 20 megahertz.

2. A local area network repeater system as recited in claim 1 wherein said local area network interface comprises a network interface selected from the following:

Ethernet network interface controller means;

Token ring network interface controller means;

Arcnet network interface controller means;

RS-232 interface controller means;

RS-485 network interface controller means;

Serial data, open standard interface; and

Parallel data interface.

3. A local area network repeater system as recited in claim 1 wherein said transmission carrier modulation and demodulation means further comprises transmission means selected from the following:

Time domain multiple access means wherein carrier data modulation and transmission is alternated with carrier data demodulation and data reception, said modulation and demodulation carriers operating on the same frequency; and Frequency domain multiple access means wherein said carrier data modulation and transmission utilizes one carrier frequency and said carrier data demodulation and reception utilizes a second frequency.

4. A local area network repeater system as recited in claim 1 further comprising repeater controller means for performing control functions selected from among the following:

initializing and controlling said network interface means, as required to permit transparent repeating of network data over the AC power line;

monitoring said data modulated transmission carriers and arbitrating data transmissions to permit only one repeater at a time to transmit a carrier of a particular frequency onto the AC power line; and attaching and removing data preambles and addresses, reformatting data, encrypting and decrypting data, and providing alternate data communications ports.

5. A repeater system for transmission of high frequency computer data signals through an AC power line, the system comprising a plurality of repeaters, each repeater comprising:

means for coupling input signals and output signals to a signal port;

carrier modulation means for frequency shift key modulating a transmission carrier with said input signals to produce a modulated signal having a bitrate of up to 2 megabits per second and a data bandwidth approximately equal to said bitrate, said modulated signal having an instantaneous bandwidth which is not substantially greater than the greater of either about twice said data bandwidth or the frequency deviation of said frequency shift key modulation;

demodulation means for demodulating said modulated signal to recover said output signals, said modulation means further comprising means for changing the resonant frequency produced by an oscillator in response to an input signal by driving an output port of the oscillator;

said demodulation means further comprising means for providing at least about 90 decibels of gain;

means for coupling bidirectional signals between said signal port and said carrier modulating and demodulation means; and means for coupling said transmission carrier to the AC power line to produce a power line carrier signal having a frequency in the range from about 2 to about 20 megahertz.

6. A method for power line carrier data transmission, said method comprising the steps of:

generating a carrier signal at a frequency in the range of from about 2 to 20 megahertz;

frequency shift key modulating said carrier signal to provide a modulated carrier signal having a data bitrate of up to 2 megabits per second and a data bandwidth approximately equal to said bitrate, said modulated carrier signal having an instantaneous bandwidth which is not substantially greater than the greater of either about twice said data bandwidth or the frequency deviation of said frequency shift key modulation; and coupling the frequency shift key modulated carrier signal onto an ac power line.

7. The method of claim 6, further comprising the steps of:

coupling the modulated carrier signal off of the AC power line; and demodulating the carrier signal.

8. The method of claim 6, wherein said modulating step comprises modulating the carrier signal to correspond to a digital data signal.

9. The method of claim 6, wherein said modulating step comprises modulating the carrier signal to correspond to an analog data signal.

10. The method of claim 6, wherein said modulating step comprises buffering with multi-stage transmitter drivers.

11. The method of claim 7, wherein said demodulating step comprises filtering the carrier signal in stages.

12. The method of claim 6, further comprising the collision avoidance steps of:

listening for traffic on the AC power line; and selecting between (a) transmitting an access request after detecting termination of a transmission, and (b) beginning data transmission after detecting no other traffic.

13. An embedded PLC communications system comprising a plurality of networked communications devices, each of said communications devices comprising:

an embedded microcontroller having a communication port;

carrier modulation means for frequency shift key modulating a transmission carrier with data signals from said communication port to produce a modulated carrier, said modulated carrier having a bitrate of up to 2 megabits per second and a data bandwidth approximately equal to said bitrate, said modulated carrier having an instantaneous bandwidth which is not substantially greater than the greater of either about twice said data bandwidth or the frequency deviation of said frequency shift key modulation; and a receiver comprising a demodulator for demodulating said modulated carrier to recover corresponding data signal, said receiver comprising at least one intermediate frequency gain and filtering stage utilizing an intermediate frequency in the range from about 2 to about 20 megahertz and providing a receiver gain of at least about 90 decibels;

means for coupling said data signals between said communication port and said carrier modulation means; and means for coupling said modulated carrier to an AC power line.

14. The system of claim 13, further comprising network arbitration and control means.

15. The system of claim 13, wherein said means for coupling said transmission carrier to an AC power line comprises an existing AC power cord.

\* \* \* \* \*

UNITED STATES PATENT AND TRADEMARK OFFICE
CERTIFICATE OF CORRECTION

PATENT NO. : 5,818,821
DATED : October 6, 1998
INVENTOR(S) : Alma Karl Schurig

It is certified that error appears in the above-identified patent and that said Letters Patent is hereby corrected as shown below:

In Claim 1, Column 10, Line 57, "her second", should be --per second--.

Signed and Sealed this

Fifteenth Day of June, 1999

Attest:

Q. TODD DICKINSON

*Attesting Officer*      *Acting Commissioner of Patents and Trademarks*